US012487538B2

(12) United States Patent
Furuta et al.

(10) Patent No.: US 12,487,538 B2
(45) Date of Patent: Dec. 2, 2025

(54) ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Tsutomu Furuta, Kanagawa (JP); Daisuke Ishizuka, Kanagawa (JP); Erina Saito, Kanagawa (JP); Tomohito Nakajima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 817 days.

(21) Appl. No.: 17/732,522

(22) Filed: Apr. 29, 2022

(65) Prior Publication Data

US 2023/0103824 A1 Apr. 6, 2023

(30) Foreign Application Priority Data

Sep. 27, 2021 (JP) ................................ 2021-157166

(51) Int. Cl.

| | |
|---|---|
| ***G03G 9/087*** | (2006.01) |
| ***G03G 9/08*** | (2006.01) |
| ***G03G 15/08*** | (2006.01) |

(52) U.S. Cl.
CPC ....... *G03G 9/08755* (2013.01); *G03G 9/0819* (2013.01); *G03G 9/08711* (2013.01); *G03G 15/08* (2013.01)

(58) Field of Classification Search
CPC ........... G03G 9/08711; G03G 9/08755; G03G 9/08797
See application file for complete search history.

(56) References Cited

FOREIGN PATENT DOCUMENTS

JP 2019015969 1/2019

OTHER PUBLICATIONS

"Notice of Reasons for Refusal of Japan Counterpart Application", issued on May 27, 2025, with English translation thereof, p. 1-p. 6.
"Notice of Reasons for Refusal of Japan Counterpart Application", issued on Sep. 30, 2025, with English translation thereof, p. 1-p. 6.

*Primary Examiner* — Peter L Vajda
(74) *Attorney, Agent, or Firm* — JCIPRNET

(57) ABSTRACT

An electrostatic charge image developing toner contains toner particles that contain a binder resin and resin particles and an external additive that contains inorganic particles, in which a loss coefficient tan $\delta_a$ of the resin particles at 40° C. and 0.1 rad/s satisfies $0.1<\tan\delta_a<1.0$, a loss coefficient tan $\delta_b$ of the resin particles at 40° C. and 10 rad/s satisfies $1.3<\tan\delta_b<3.0$, and in a case where a strain of 0.005% is applied to the toner at 40° C., a stress relaxation time $\tau$ of the toner satisfies 5 seconds$<\tau<$500 seconds.

14 Claims, 2 Drawing Sheets

ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2021-157166 filed Sep. 27, 2021.

BACKGROUND

(i) Technical Field

The present invention relates to an electrostatic charge image developing toner, an electrostatic charge image developer, a toner cartridge, a process cartridge, an image forming apparatus, and an image forming method.

(ii) Related Art

JP2019-15969A has proposed "a toner binder containing a nonlinear polyester resin (A) configured with raw materials consisting of a polyol component (xa) and a polycarboxylic acid component (ya), in which a softening point of the nonlinear polyester resin (A) is 125° C. to 150° C., an acid value of the nonlinear polyester resin (A) is 25 to 45 mgKOH/g, and the nonlinear polyester resin (A) satisfies the following Relational Expression (1).

$$5 \leq G'\ (50\ \text{Hz})/G'\ (0.2\ \text{Hz}) \leq 25 \qquad (1)$$

[Here, in Relational] (1), G' (50 Hz) represents a storage modulus (unit: Pa) at 160° C. and 50 Hz, and G' (0.2 Hz) represents a storage modulus (unit: Pa) at 160° C. and 0.2 Hz]".

SUMMARY

Aspects of non-limiting embodiments of the present disclosure relate to an electrostatic charge image developing toner, an electrostatic charge image developer, a toner cartridge, a process cartridge, an image forming apparatus, and an image forming method that have toner particles containing a binder resin and resin particles and an external additive containing inorganic particles and is further inhibited from contaminating the inside of a device, compared to an electrostatic charge image developing toner in which a loss coefficient tan $\delta_a$ of resin particles at 40° C. and 0.1 rad/s does not satisfy $0.1<\tan\delta_a<1.0$, a loss coefficient tan $\delta_b$ of resin particles at 40° C. and 10 rad/s does not satisfy $1.3<\tan\delta_b<3.0$, or in a case where a strain of 0.005% is applied to the toner at 40° C., a stress relaxation time $\tau$ of the toner does not satisfy 5 seconds$<\tau<$500 seconds.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

The above aspect is achieved by the following means.

According to an aspect of the present disclosure, there is provided an electrostatic charge image developing toner contains toner particles that contain a binder resin and resin particles and an external additive that contains inorganic particles, in which a loss coefficient tan $\delta_a$ of the resin particles at 40° C. and 0.1 rad/s satisfies $0.1<\tan\delta_a<1.0$, a loss coefficient tan $\delta_b$ of the resin particles at 40° C. and 10 rad/s satisfies $1.3<\tan\delta_b<3.0$, and in a case where a strain of 0.005% is applied to the toner at 40° C., a stress relaxation time $\tau$ of the toner satisfies 5 seconds$<\tau<$500 seconds.

BRIEF DESCRIPTION OF THE DRAWINGS

Exemplary embodiment(s) of the present invention will be described in detail based on the following figures, wherein.

DETAILED DESCRIPTION

Figure 1:
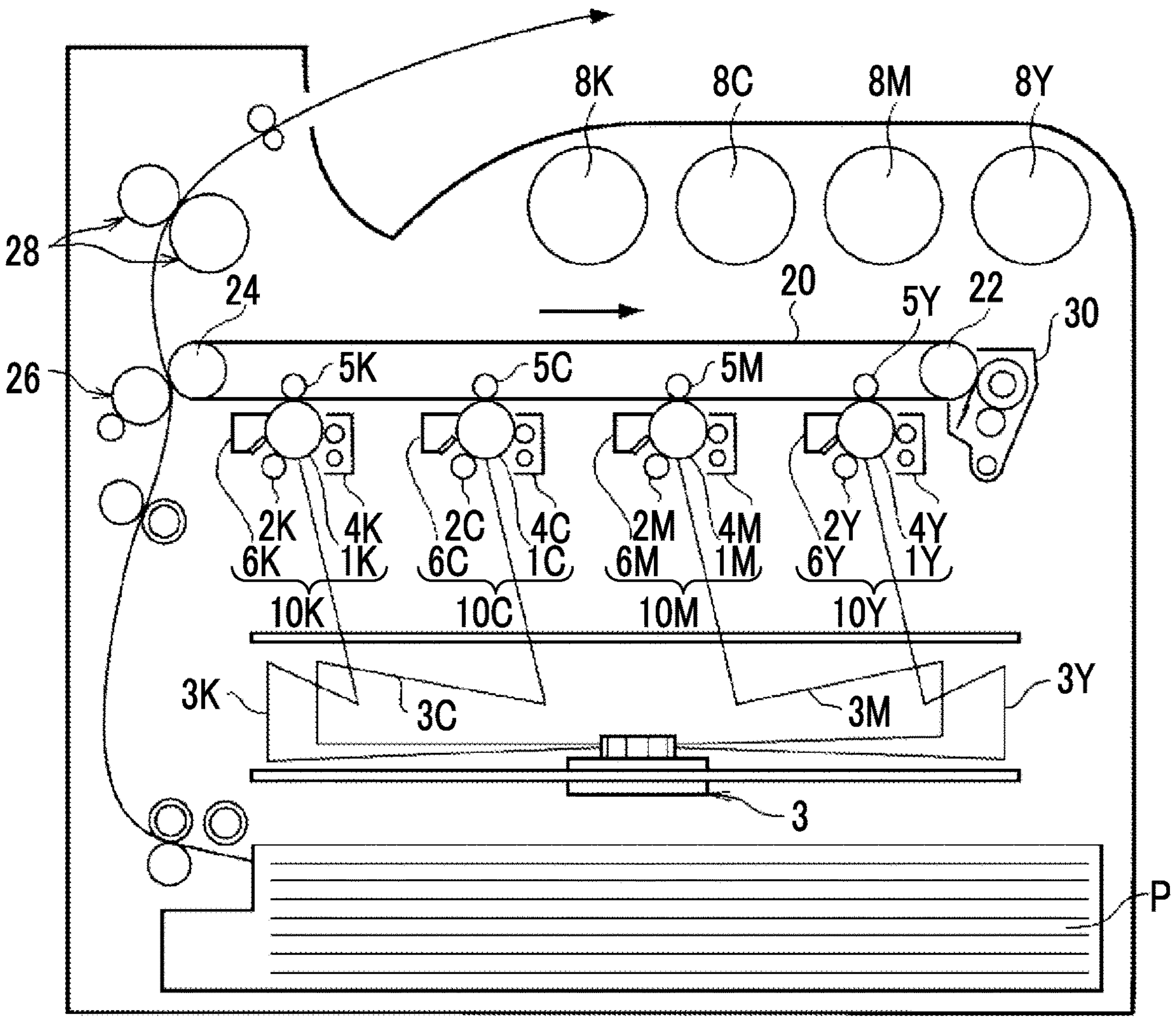
FIG. 1 is a view schematically showing the configuration of an example of an image forming apparatus according to the present exemplary embodiment; and is a view schematically showing the FIG. 2 configuration of an example of a process cartridge detachable from the image forming apparatus according to the present exemplary embodiment.

The exemplary embodiments as an example of the present invention will be described below. The following descriptions and examples merely illustrate the exemplary embodiments, and do not limit the scope of the invention.

Regarding the ranges of numerical values described in stages in the present specification, the upper limit or lower limit of a range of numerical values may be replaced with the upper limit or lower limit of another range of numerical values described in stages. Furthermore, in the present specification, the upper limit or lower limit of a range of numerical values may be replaced with values described in examples.

In the present specification, "(meth)acryl" means both the acryl and methacryl.

Each component may include a plurality of corresponding substances.

In a case where the amount of each component in a composition is mentioned, and there are two or more kinds of substances corresponding to each component in the composition, unless otherwise specified, the amount of each component means the total amount of two or more kinds of the substances present in the composition.

Electrostatic Charge Image Developing Toner

The electrostatic charge image developing toner according to the present exemplary embodiment (hereinafter, also called "toner") has toner particles containing a binder resin and resin particles and an external additive containing inorganic particles.

Furthermore, a loss coefficient tan $\delta_a$ of the resin particles at 40° C. and 0.1 rad/s satisfies $0.1<\tan\delta_a<1.0$, and a loss coefficient tan $\delta_a$ of the resin particles at 40° C. and 10 rad/s satisfies $1.3<\tan\delta_b<3.0$.

In addition, in a case where a strain of 0.005% is applied to the toner at 40° C., a stress relaxation time $\tau$ of the toner satisfies 5 seconds$<\tau<$500 seconds.

The toner according to the present exemplary embodiment is a toner that is further inhibited from contaminating the inside of a device due to the above configuration. The reason is presumed as follows.

In the case of toner having toner particles containing a binder resin and resin particles and an external additive containing inorganic particles, due to the contact between the toner and a carrier in a developing device and the rub of the toner against a developing member (hereinafter, also called "developing sleeve"), sometimes the external additive is buried under the toner particles. In a case where such a toner is used for continuously forming images with a low image density (for example, images with an image density of 1% or less), sometimes the burial of the external additive markedly occurs.

Furthermore, in a case where the toner in which the external additive is buried under the toner particles is used for forming images with a high image density (for example, images with an image density of 50% or more), sometimes a difference is made between the chargeability of the toner in the developing device and the chargeability of the toner supplied from a toner cartridge. In this case, mutual charging of the toners occurs, and a part of the toners is charged to a low level, which sometimes leads to the contamination of the inside of the device.

On the other hand, as for the toner according to the present exemplary embodiment, in a case where a strain of 0.005% is applied to the toner at 40° C., a stress relaxation time $\tau$ of the toner is in a range of 5 seconds<$\tau$<500 seconds. In a case where the stress relaxation time $\tau$ of the toner exceeds 5 seconds, the viscosity of the toner particles does not increase too much, the toner particle deformation caused by the contact with the carrier is suppressed, and the occurrence of burial of the external additive resulting from the toner deformation can be suppressed. Furthermore, in a case where the stress relaxation time $\tau$ of the toner is less than 500 seconds, the elasticity of the toner particles does not increase too much, stress accumulation resulting from the rub against the developing sleeve is suppressed, and the occurrence of brittle fracture-induced breakage of the toner particle surface is suppressed. Accordingly, it is possible to suppress the occurrence of burial of the external additive resulting from the breakage of the toner particle surface.

Furthermore, in the toner according to the present exemplary embodiment, resin particles (hereinafter, also simply called "specific resin particles") are incorporated into the toner particles, in which a loss coefficient tan $\delta_a$ of the resin particles at 40° C. and 0.1 rad/s satisfies 0.1<tan $\delta_a$<1.0, and a loss coefficient tan $\delta_b$ of the resin particles at 40° C. and 10 rad/s satisfies 1.3<tan $\delta_b$<3.0.

The specific resin particles in which the loss coefficient tan $\delta_a$ at 40° C. and 0.1 rad/s satisfies 0.1<tan $\delta_a$<1.0 exhibits the properties of an elastic material in a case where the specific resin particles collide with another object. Therefore, the toner particles containing the specific resin particles are influenced by such properties of the specific resin particles. As a result, in a case where the toner collides with another object (for example, contact between the toner and the carrier), the toner particles exhibit the properties of an elastic material and suppress the burial of the external additive.

The specific resin particles in which the loss coefficient tan $\delta_b$ at 40° C. and 10 rad/s satisfies 1.3<tan $\delta_b$<3.0 exhibit the properties of a viscous material in a case where the specific resin particles are rubbed against another object. The toner containing the specific resin particles is influenced by such properties of the specific resin particles. As a result, in a case where the toner is rubbed against another object (for example, the rub of the toner against the developing sleeve), the toner exhibits the properties of a viscous material, which makes it possible to disperse the stress applied to the toner particles and suppress the burial of the external additive.

For the aforementioned reasons, in the toner according to the present exemplary embodiment, the phenomenon where the external additive is buried under the toner particles due to the contact with a carrier in the developing device and the rub against the developing sleeve is suppressed. Therefore, a difference is unlikely to made between the chargeability of the toner in the developing device and the chargeability of the toner supplied from the toner cartridge. Consequently, the occurrence of mutual charging of the toners is suppressed, ununiform charging of the toners is unlikely to occur, and the contamination of the inside of the device is suppressed.

Presumably, for the aforementioned reasons, the toner according to the present exemplary embodiment may be inhibited from contaminating the inside of a device.

Toner Particles

The toner particles contain a binder resin and specific resin particles, and, as necessary, are configured with a colorant, a release agent, and other additives.

Binder Resin

Examples of the binder resin include vinyl-based resins consisting of a homopolymer of a monomer, such as styrenes (for example, styrene, p-chlorostyrene, $\alpha$-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these binder resins may be used alone, or two or more kinds of these binder resins may be used in combination.

For example, it is preferable that the binder resin contain a polyester resin.

In a case where the binder resin contains a polyester resin, a difference between an SP value(S) as a solubility parameter of the resin particles and an SP value (R) as a solubility parameter of the binder resin (SP value(S)−SP value (R)), which will be described later, is likely to fall into, for example, a preferable numerical range. In a case where the difference falls into the above range, the dispersibility of the specific resin fine particles in the toner particles is improved, and the toner is likely to exhibit the properties derived from the specific resin particles. Therefore, in a case where the toner and another object are slowly rubbed against each other, the toner is more likely to exhibit elasticity, and in a case where the toner and another object are rubbed against each other fast, the toner is more likely to exhibit viscosity. Accordingly, the burial of the external additive is further suppressed, and the toner is likely be further inhibited from contaminating the inside of the device.

For example, it is preferable that the binder resin contain a crystalline resin and an amorphous resin.

The crystalline resin means a resin having a clear endothermic peak instead of showing a stepwise change in amount of heat absorbed, in differential scanning calorimetry (DSC).

In contrast, the amorphous resin means a resin which shows only a stepwise change in amount of heat absorbed instead of having a clear endothermic peak in a case where the resin is measured by a thermoanalytical method using differential scanning calorimetry (DSC), and stays as a solid at room temperature but turns thermoplastic at a temperature equal to or higher than a glass transition temperature.

Specifically, for example, the crystalline resin means a resin which has a half-width of an endothermic peak of 10° C. or less in a case where the resin is measured at a heating rate of 10° C./min, and the amorphous resin means a resin which has a half-width of more than 10° C. or a resin for which a clear endothermic peak is not observed.

The crystalline resin will be described.

Examples of the crystalline resin include known crystalline resins such as a crystalline polyester resin and a crystalline vinyl resin (for example, a polyalkylene resin, a long-chain alkyl (meth)acrylate resin, and the like). Among these, in view of mechanical strength and low-temperature fixability of the toner, for example, a crystalline polyester resin is preferable.

Crystalline Polyester Resin

Examples of the crystalline polyester resin include a polycondensate of a polyvalent carboxylic acid and a polyhydric alcohol. As the crystalline polyester resin, a commercially available product or a synthetic resin may be used.

The crystalline polyester resin easily forms a crystal structure. Therefore, for example, a polycondensate which uses not a polymerizable monomer having an aromatic group but a polymerizable monomer having a linear aliphatic group is preferable.

Examples of the polyvalent carboxylic acid include aliphatic dicarboxylic acids (for example, oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, 1,18-octadecanedicarboxylic acid, and the like), aromatic dicarboxylic acids (for example, dibasic acids such as phthalic acid, isophthalic acid, terephthalic acid, and naphthalene-2,6-dicarboxylic acid), anhydrides of these, and lower alkyl esters (for example, having 1 or more and 5 or less carbon atoms) of these.

As the polyvalent carboxylic acid, a carboxylic acid having a valency of 3 or more that has a crosslinked structure or a branched structure may be used in combination with a dicarboxylic acid. Examples of trivalent carboxylic acids include aromatic carboxylic acids (for example, 1, 2, 3-benzenetricarboxylic acid, 1,2,4-benzenetricarboxylic acid, 1,2,4-naphthalenetricarboxylic acid, and the like), anhydrides of these, and lower alkyl esters (for example, having 1 or more and 5 or less carbon atoms) of these.

As the polyvalent carboxylic acid, a dicarboxylic acid having a sulfonic acid group and a dicarboxylic acid having an ethylenic double bond may be used in combination with these dicarboxylic acids.

One kind of polyvalent carboxylic acid may be used alone, or two or more kinds of polyvalent carboxylic acids may be used in combination.

Examples of the polyhydric alcohol include an aliphatic diol (for example, a linear aliphatic diol having 7 or more and 20 or less carbon atoms in the main chain portion). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, and the like. As the aliphatic diol, among these, for example, 1,8-octanediol, 1,9-nonanediol, and 1,10-decanediol are preferable.

As the polyhydric alcohol, an alcohol having three or more hydroxyl groups and a crosslinked structure or a branched structure may be used in combination with a diol. Examples of the alcohol having three or more hydroxyl groups include glycerin, trimethylolethane, trimethylolpropane, pentaerythritol, and the like.

One kind of polyhydric alcohol may be used alone, or two or more kinds of polyhydric alcohols may be used in combination.

The content of the aliphatic diol in the polyhydric alcohol may be 80 mol % or more and, for example, preferably 90 mol % or more.

The melting temperature of the crystalline polyester resin is, for example, preferably 50° C. or higher and 100° C. or lower, more preferably 55° C. or higher and 90° C. or lower, and even more preferably 60° C. or higher and 85° C. or lower.

The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The weight-average molecular weight (Mw) of the crystalline polyester resin is, for example, preferably 6,000 or more and 35,000 or less.

The crystalline polyester resin can be obtained by a known manufacturing method, for example, just as amorphous polyester.

The amorphous resin will be described.

Examples of the amorphous resin include known amorphous resins such as an amorphous polyester resin, an amorphous vinyl resin (for example, a styrene acrylic resin), an epoxy resin, a polycarbonate resin, and a polyurethane resin. Among these, for example, an amorphous polyester resin and an amorphous vinyl resin (particularly, a styrene acrylic resin) are preferable, and an amorphous polyester resin is more preferable.

Amorphous Polyester Resin

Examples of the amorphous polyester resin include a polycondensate of a polyvalent carboxylic acid and a polyhydric alcohol. As the amorphous polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of these, lower alkyl esters (for example, having 1 or more and 5 or less carbon atoms) of these, and the like.

One kind of polyvalent carboxylic acid may be used alone, or two or more kinds of polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among these, for example, aromatic diols and alicyclic diols are preferable as the polyhydric alcohol, and aromatic diols are more preferable.

As the polyhydric alcohol, a polyhydric alcohol having three or more hydroxyl groups and a crosslinked structure or a branched structure may be used in combination with a diol. Examples of the polyhydric alcohol having three or more hydroxyl groups include glycerin, trimethylolpropane, and pentaerythritol.

One kind of polyhydric alcohol may be used alone, or two or more kinds of polyhydric alcohols may be used in combination.

The glass transition temperature (Tg) of the amorphous polyester resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K7121-1987, "Testing methods for transition temperatures of plastics".

The weight-average molecular weight (Mw) of the amorphous polyester resin is, for example, preferably 5,000 or more and 1,000,000 or less, and more preferably 7,000 or more and 500,000 or less.

The number-average molecular weight (Mn) of the amorphous polyester resin is, for example, preferably 2,000 or more and 100,000 or less.

The molecular weight distribution Mw/Mn of the amorphous polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC·HCL-8120GPC manufactured by Tosoh Corporation as a measurement device, TSKgel.Super HM-M (15 cm) manufactured by Tosoh Corporation as a column, and THE as a solvent. The weight-average molecular weight and the number-average molecular weight are calculated using a molecular weight calibration curve plotted using a monodisperse polystyrene standard sample from the measurement results.

The amorphous polyester resin is obtained by a known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, for example, a polycondensation reaction is carried out in a state where the solubilizer is being distilled off. In a case where a monomer with poor compatibility takes part in the reaction, for example, the monomer with poor compatibility may be condensed in advance with an acid or an alcohol that is to be polycondensed with the monomer, and then polycondensed with the major component.

The content of the binder resin with respect to the total amount of the toner particles is, for example, preferably 40% by mass or more and 95% by mass or less, more preferably 50% by mass or more and 90% by mass or less, and even more preferably 60% by mass or more and 85% by mass or less.

Mass Ratio Between Content A of Amorphous Resin and Content C of Crystalline Resin A mass ratio (C/A) of a content C of the crystalline resin to a content A of the amorphous resin is, for example, preferably 3/97 or more and 50/50 or less, and more preferably 7/93 or more and 30/70 or less.

Glass Transition Temperature (Tg) of Amorphous Resin

The glass transition temperature (Tg) of the amorphous resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K7121-1987, "Testing methods for transition temperatures of plastics".

In a case where the mass ratio (C/A) and the glass transition temperature (Tg) of the amorphous resin are within the above numerical ranges, it is easier to obtain a toner in which the stress relaxation time $\tau$ satisfies 5 seconds$<\tau<$500 seconds in a case where a strain of 0.005% is applied to the toner at 40° C.

Specific Resin Particles

In the specific resin particles, a loss coefficient tan $\delta_a$ at 40° C. and 0.1 rad/s satisfies $0.1<\tan\delta_a<1.0$, and a loss coefficient tan $\delta_b$ at 40° C. and 10 rad/s satisfies $1.3<\tan\delta_b<3.0$.

In a case where the loss coefficient tan $\delta_a$ is more than 0.1, brittle fracture-induced breakage of the toner particle surface caused by the contact with a carrier is suppressed, and the burial of the external additive is suppressed. On the other hand, in a case where the loss coefficient tan $\delta_a$ is less than 1.0, the burial of the external additive caused by the strain of the toner particles resulting from the contact with a carrier is suppressed.

In a case where the loss coefficient tan $\delta_b$ is more than 1.3, the stress caused by rub against the developing sleeve is dispersed, and the stress-induced burial of the external additive is suppressed. On the other hand, in a case where the loss coefficient tan $\delta_b$ is less than 3.0, the burial of the external additive caused by the strain of the toner particles resulting from the rub against the developing sleeve is suppressed.

The loss coefficient of the specific resin particles is a value measured using a rheometer.

As the rheometer, for example, "ARES-G2 (trade name)" manufactured by TA Instruments LTD can be used.

Hereinafter, the procedure for measuring the loss coefficient tan $\delta_a$ and the loss coefficient tan $\delta_b$ will be specifically described.

Resin particles as a measurement target are melted by heating at 100° C., thereby preparing a disk-shaped sample having a thickness of 2 mm and a diameter of 8 mm. The disk-shaped sample is sandwiched between parallel plates having a diameter of 8 mm, and loss coefficients are measured under the measurement conditions of frequency: 0.1 rad/s or 10 rad/s, measurement temperature: 40° C., and strain: 1%.

The loss coefficient at a frequency of 0.1 rad/s is denoted by tan $\delta_a$, and the loss coefficient at a frequency of 10 rad/s is denoted by tan $\delta_b$.

From the viewpoint of improving the elasticity of the specific resin particles and further suppressing the burial of the external additive caused by the contact between the toner and a carrier, the loss coefficient tan $\delta_a$, for example, preferably satisfies 0.2<tan $\delta_a$<0.9, more preferably satisfies 0.3<tan $\delta_a$<0.8, and even more preferably satisfies 0.4<tan $\delta_a$<0.7.

From the viewpoint of improving the viscosity of the specific resin particles and further suppressing the burial of the external additive caused by the rub of the toner against the developing toner, the loss coefficient tan $\delta_b$, for example, preferably satisfies 1.5<tan $\delta_b$<2.8, more preferably satisfies 1.7<tan $\delta_b$<2.6, and even more preferably satisfies 1.9<tan $\delta_b$<2.4.

A storage modulus G' of the specific resin particles at 40° C. and 10 rad/s, for example, preferably satisfies $1\times10^5$ Pa<G'<$1\times10^7$ Pa, more preferably satisfies $2\times10^5$ Pa<G'<$3\times10^6$ Pa, and even more preferably satisfies $3\times10^5$ Pa<G'<$7\times10^5$ Pa.

In a case where the storage modulus G' of the specific resin particles is a value higher than $1\times10^5$ Pa, the flexibility of the specific resin particles does not increase too much. Therefore, the flexibility of the toner containing the specific resin particles does not increase too much, and the burial of the external additive is further suppressed.

In a case where the storage modulus G' of the specific resin particles is a value less than $1\times10^7$ Pa, the hardness of the specific resin particles does not increase too much. Therefore, the hardness of the toner containing the specific resin particles does not increase too much, stress accumulation in the toner is suppressed, and the occurrence of brittle fracture-induced breakage of the toner surface is suppressed. Accordingly, the occurrence of burial of the external additive caused by the toner surface breakage is further suppressed.

The storage modulus G' of the specific resin particles is a value measured using a rheometer.

As the rheometer, for example, "ARES-G2 (trade name)" manufactured by TA Instruments LTD can be used.

Hereinafter, the procedure for measuring the storage modulus G' will be specifically described.

Resin particles as a measurement target are melted by heating at 100° C., thereby preparing a disk-shaped sample having a thickness of 2 mm and a diameter of 8 mm. The disk-shaped sample is sandwiched between parallel plates having a diameter of 8 mm, and the storage modulus G' is measured under the measurement conditions of frequency: 10 rad/s, measurement temperature: 40° C., and strain: 1%.

For example, the specific resin particles are preferably crosslinked resin particles.

"Crosslinked resin particles" refer to resin particles having a bridging structure between specific atoms in the polymer structure contained in the resin particles.

In a case where crosslinked resin particles are used as the specific resin particles, it is easier to obtain resin particles in which the loss coefficient tan $\delta_a$ satisfies 0.1<tan $\delta_a$<1.0 and the loss coefficient tan $\delta_b$ satisfies 1.3<tan $\delta_b$<3.0. Therefore, it is easier to obtain a toner further inhibited from contaminating the inside of a device.

Examples of the crosslinked resin particles include crosslinked resin particles crosslinked by ionic bonds (ionically crosslinked resin particles), crosslinked resin particles crosslinked by covalent bonds (covalently crosslinked resin particles), and the like. As the crosslinked resin particles, among these, for example, crosslinked resin particles crosslinked by covalent bonds are preferable.

The types of resin used for the crosslinked resin particles include a polyolefin-based resin (such as polyethylene or polypropylene), a styrene-based resin (such as polystyrene or α-polymethylstyrene), a (meth)acrylic resin (such as polymethyl methacrylate or polyacrylonitrile), an epoxy resin, a polyurethane resin, a polyurea resin, a polyamide resin, a polycarbonate resin, a polyether resin, a polyester resin, and copolymer resins of these. As necessary, each of these resins may be used alone, or two or more of these resins may be used in combination.

As the resin used for the crosslinked resin particles, among the above resins, for example, a styrene-(meth) acrylic copolymer resin is preferable.

That is, as the crosslinked resin particles, for example, styrene-(meth)acrylic copolymer resin particles are preferable.

In a case where styrene-(meth)acrylic copolymer resin particles are used as the crosslinked resin particles, it is easier to obtain resin particles in which the loss coefficient tan $\delta_a$ satisfies 0.1<tan $\delta_a$<1.0 and the loss coefficient tan $\delta_a$ satisfies 1.3<tan $\delta_b$<3.0. Therefore, it is easier to obtain a toner further inhibited from contaminating the inside of a device.

Examples of the styrene-(meth)acrylic copolymer resin include resins obtained by polymerizing the following styrene-based monomer and (meth)acrylic monomer by radical polymerization.

Examples of the styrene-based monomer include styrene, α-methylstyrene, vinylnaphthalene, alkyl-substituted styrene having an alkyl chain, such as 2-methylstyrene, 3-methylstyrene, 4-methylstyrene, 2-ethylstyrene, 3-ethylstyrene, and 4-ethylstyrene, halogen-substituted styrene such as 2-chlorostyrene, 3-chlorostyrene, and 4-chlorostyrene, fluorine-substituted styrene such as 4-fluorostyrene and 2,5-difluorostyrene, and the like. Among these, for example, styrene and α-methylstyrene are preferable.

Examples of the (meth)acrylic monomer include (meth) acrylic acid, n-methyl (meth)acrylate, n-ethyl (meth)acrylate, n-propyl (meth)acrylate, n-butyl (meth)acrylate, n-hexyl (meth)acrylate, n-pentyl (meth)acrylate, n-heptyl (meth)acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth)acrylate, isooctyl (meth)acrylate, 2-ethylhexyl (meth)acrylate, phenyl (meth)acrylate, biphenyl (meth)acrylate, diphenyl ethyl (meth)acrylate, t-butylphenyl (meth)acrylate, terphenyl (meth)acrylate, cyclohexyl (meth)acrylate, t-butylcyclohexyl (meth)acrylate, dimethylaminoethyl (meth)acrylate, diethylaminoethyl (meth)acrylate, methoxyethyl (meth) acrylate, 2-hydroxyethyl (meth)acrylate, β-carboxyethyl (meth)acrylate, (meth)acrylonitrile, (meth)acrylamide, and the like. Among these, for example, n-butyl (meth)acrylate and β-carboxyethyl (meth)acrylate are preferable.

Examples of crosslinking agents for crosslinking the resin in the crosslinked resin particles include aromatic and polyvinyl compounds such as divinylbenzene divinylnaphthalene; polyvinyl esters of aromatic polyvalent carboxylic acids, such as divinyl phthalate, divinyl isophthalate, divinyl terephthalate, divinyl homophthalate, divinyl trimesate, trivinyl trimesate, divinyl naphthalenedicarboxylate, and divinyl biphenylcarboxylate; divinyl esters of nitrogen-containing aromatic compounds, such as divinyl pyridine dicarboxylate; vinyl esters of unsaturated heterocyclic compound carboxylic acid, such as vinyl pyromucate, vinyl furan carboxylate, vinyl pyrrole-2-carboxylate, and vinyl thiophene carboxylate; (meth)acrylic acid esters of linear polyhydric alcohols, such butanediol methacrylate, hexanediol acrylate, octanediol methacrylate, decanediol acrylate, and dodecanediol methacrylate; (meth)acrylic acid esters of branched substituted polyhydric alcohols, such as neopentylglycol dimethacrylate and 2-hydroxy-1,3-diacryloxypropane; polyvinyl esters of polyvalent carboxylic acids, such as polyethylene glycol di(meth)acrylate, polypropylene polyethylene glycol di(meth)acrylates, divinyl succinate, divinyl fumarate, vinyl maleate, divinyl maleate, divinyl diglycolate, vinyl itaconate, divinyl itaconate, divinyl acetone dicarboxylate, divinyl glutarate, 3,3'-divinylthiodipropionate, divinyl trans-aconitate, trivinyl trans-aconitate, divinyl adipate, divinyl pimelate, divinyl suberate, divinyl azelate, divinyl sebacate, divinyl dodecanedioate, and divinyl brassylate, and the like. One kind of crosslinking agent may be used alone, or two or more kinds of crosslinking agents may be used in combination.

For example, the dispersion diameter of the specific resin particles is preferably 50 nm or more and 500 nm or less.

In a case where the dispersion diameter of the specific resin particles is within the above numerical range, the dispersibility of the specific resin particles in the toner particles is likely to be improved. In a case where the dispersibility of the specific resin particles is improved, the toner is likely to exhibit the properties derived from the specific resin particles. Therefore, in a case where the toner and another object are slowly rubbed against each other, the toner is more likely to exhibit elasticity, and in a case where the toner and another object are rubbed against each other fast, the toner is more likely to exhibit viscosity. Accordingly, the burial of the external additive is further suppressed, and the toner is likely be further inhibited from contaminating the inside of the device.

For example, the dispersion diameter of the specific resin particles is more preferably 60 nm or more and 400 nm or less, and even more preferably 70 nm or more and 300 nm or less.

The dispersion diameter of the specific resin particles is a value measured using a transmission electron microscope (TEM).

As the transmission electron microscope, for example, JEM-2100plus manufactured by JEOL Ltd. can be used.

Hereinafter, a method for measuring the dispersion diameter of the specific resin particles will be specifically described.

The toner particles are cut in a thickness of about 0.1 μm with a microtome. The cross section of the toner particles is imaged at 10,000× magnification by using a transmission electron microscope, equivalent circular diameters of 100 resin particles dispersed in the toner particles are calculated based on the cross-sectional areas of the particles, and an arithmetic mean thereof is calculated and adopted as the dispersion diameter.

The content of the specific resin particles with respect to the total mass of the electrostatic charge image developing toner is, for example, preferably 18 by mass or more and 30% by mass or less, more preferably 5% by mass or more and 20% by mass or less, and even more preferably 7% by mass or more and 15% by mass or less.

In a case where the content of the specific resin particles is 1% by mass or more and 30% by mass or less with respect to the total mass of the electrostatic charge image developing toner, the content of the specific resin particles in the toner particles is enough for the toner to readily exhibit the properties derived from the specific resin particles. As a result, in a case where the toner and a carrier come into contact with each other, the toner particles are more likely to exhibit the properties of an elastic material, and in a case where the toner and a developing sleeve are rubbed against each other, the toner particles are more likely to exhibit the properties of a viscous material. Accordingly, the burial of the external additive is further suppressed, and the toner is likely be further inhibited from contaminating the inside of the device.

Release Agent

Examples of the release agent include hydrocarbon-based wax; natural wax such as carnauba wax, rice wax, and candelilla wax; synthetic or mineral·petroleum-based wax such as montan wax; ester-based wax such as fatty acid esters and montanic acid esters; and the like. The release agent is not limited to these.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The content of the release agent with respect to the total amount of the toner particles is, for example, preferably 1% by mass or more and 20% by mass or less, and more preferably 5% by mass or more and 15% by mass or less.

Colorant

Examples of colorants include various pigments such as carbon black, chrome yellow, Hansa yellow, benzidine yellow, indanthrene yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultra marine blue, calco oil blue, methylene blue chloride, phthalocyanine blue, pigment blue, phthalocyanine green, and malachite green oxalate, various dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye, and the like.

One kind of colorant may be used alone, or two or more kinds of colorants may be used in combination.

As the colorant, a colorant having undergone a surface treatment as necessary may be used, or a dispersant may be used in combination with the colorant. Furthermore, a plurality of kinds of colorants may be used in combination.

The content of the colorant with respect to the total mass of the toner particles is, for example, preferably 1% by mass or more and 30% by mass or less, and more preferably 3% by mass or more and 15% by mass or less.

Other Additives

Examples of other additives include well-known additives such as a magnetic material, a charge control agent, and inorganic powder. These additives are incorporated into the toner particles as internal additives.

Difference (SP Value(*S*)−SP Value (*R*))

A difference between an SP value(S) as a solubility parameter of the specific resin particles and an SP value (R) as a solubility parameter of the binder resin (SP value (S)−SP value (R)) is, for example, preferably −1.0 or more and 1.0 or less.

In a case where the difference (SP value(S)−SP value (R)) is −1.0 or more and 1.0 or less, the affinity between the specific resin particles and the binder resin is likely to be improved. In a case where the affinity is improved, the dispersibility of the specific resin particles in the toner particles is likely to be further improved. In a case where the dispersibility of the specific resin particles is improved, the toner is likely to exhibit the properties derived from the specific resin particles. As a result, in a case where the toner and a carrier come into contact with each other, the toner particles are more likely to exhibit the properties of an elastic material, and in a case where the toner and a developing sleeve are rubbed against each other, the toner particles are more likely to exhibit the properties of a viscous material. Accordingly, the burial of the external additive is further suppressed, and the toner is likely be further inhibited from contaminating the inside of the device.

The difference (SP value(S)−SP value (R)) is, for example, more preferably −0.9 or more and 0.9 or less, and even more preferably −0.8 or more and 0.8 or less.

The SP value(S) as a solubility parameter of the specific resin particles is, for example, preferably 8.5 or more and 11.5 or less, more preferably 9.0 or more and 11.0 or less, and even more preferably 9.2 or more and 10.8 or less.

The SP value(S) as a solubility parameter of the specific resin particles and the SP value (R) as a solubility parameter of the binder resin (unit: $(cal/cm^3)^{1/2}$) is calculated by the Fedors' method. Specifically, the SP values are calculated by the following equation.

$$\text{SP value}=\sqrt{(Ev/v)}=\sqrt{(\Sigma\Delta ei/\Sigma\Delta vi)} \qquad \text{Equation:}$$

(In the equation, Ev: evaporation energy (cal/mol), V: molar volume ($cm^3$/mol), Δei: evaporation energy of each atom or atomic group, Δvi: molar volume of each atom or atomic group)

Details of this calculation method are described in Polym. Eng. Sci., Vol. 14, p. 147 (1974), Junji Mukai et al., "Practical Polymers for Engineers", p. 66 (Kodansha, 1981), Polymer Handbook (4th Edition, Wiley-interscience Publication), and the like. The same method as described in these documents can also be used in the present exemplary embodiment.

In the present exemplary embodiment, $(cal/cm^3)^{1/2}$ is adopted as the unit of the SP value. In the present specification, the SP value is dimensionlessly written without the unit according to the custom.

Characteristics of Toner Particles and The Like

The toner particles may be toner particles that have a single-layer structure or toner particles having a so-called core·shell structure that is configured with a core portion (core particle) and a coating layer (shell layer) covering the core portion.

The toner particles having a core·shell structure may, for example, be configured with a core portion that is configured with a binder resin and other additives used as necessary, such as a colorant and a release agent, and a coating layer that is configured with a binder resin.

The volume-average particle size (D50v) of the toner particles is, for example, preferably 2 μm or more and 10 μm or less, and more preferably 4 μm or more and 8 μm or less.

The various average particle sizes and various particle size distribution indexes of the toner particles are measured using COULTER MULTISIZER II (manufactured by Beckman Coulter Inc.) and using ISOTON-II (manufactured by Beckman Coulter Inc.) as an electrolytic solution.

For measurement, a measurement sample in an amount of 0.5 mg or more and 50 mg or less is added to 2 ml of a 5% aqueous solution of, for example, a surfactant (preferably sodium alkylbenzene sulfonate) as a dispersant. The obtained solution is added to an electrolytic solution in a volume of 100 ml or more and 150 ml or less.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

For the particle size range (channel) divided based on the measured particle size distribution, a cumulative volume distribution and a cumulative number distribution are drawn from small-sized particles. The particle size at which the cumulative proportion of particles is 16% is defined as volume-based particle size D16v and a number-based particle size D16p. The particle size at which the cumulative proportion of particles is 50% is defined as volume-average particle size D50v and a cumulative number-average particle size D50p. The particle size at which the cumulative proportion of particles is 84% is defined as volume-based particle size D84v and a number-based particle size D84p.

By using these, a volume-average particle size distribution index (GSDv) is calculated as $(D84v/D16v)^{1/2}$, and a number-average particle size distribution index (GSDp) is calculated as $(D84p/D16p)^{1/2}$.

The average circularity of the toner particles is, for example, preferably 0.94 or more and 1.00 or less, and more preferably 0.95 or more and 0.98 or less.

The average circularity of the toner particles is determined by (equivalent circular perimeter)/(perimeter) [(perimeter of circle having the same projected area as particle image)/(perimeter of projected particle image)]. Specifically, the average circularity is a value measured by the following method.

First, toner particles as a measurement target are collected by suction, and a flat flow of the particles is formed. Then, an instant flash of strobe light is emitted to the particles, and the particles are imaged as a still image. By using a flow-type particle image analyzer (FPIA-3000 manufactured by Sysmex Corporation) performing image analysis on the particle image, the average circularity is determined. The number of samplings for obtaining the average circularity is 3,500.

In a case where a toner contains external additives, the toner (developer) as a measurement target is dispersed in water containing a surfactant, then the dispersion is treated with ultrasonic waves so that the external additives are removed, and the toner particles are collected.

External Additive

The toner has an external additive containing inorganic particles.

Examples of the inorganic particles include $SiO_2$, $TiO_2$, $Al_2O_3$, CuO, ZnO, $SnO_2$, $CeO_2$, $Fe_2O_3$, MgO, Bao, Cao, $K_2O$, $Na_2O$, $ZrO_2$, $CaO{\cdot}SiO_2$, $K_2O{\cdot}(TiO_2)_n$, $Al_2O_3{\cdot}2SiO_2$, $CaCO_3$, $MgCO_3$, $BaSO_4$, $MgSO_4$, and the like.

The surface of the inorganic particles as an external additive may have undergone, for example, a hydrophobizing treatment. The hydrophobizing treatment is performed, for example, by immersing the inorganic particles in a hydrophobing agent. The hydrophobing agent is not particularly limited, and examples thereof include a silane-based coupling agent, silicone oil, a titanate-based coupling agent, an aluminum-based coupling agent, and the like. One kind of each of these agents may be used alone, or two or more kinds of these agents may be used in combination.

Usually, the amount of the hydrophobing agent is, for example, 1 part by mass or more and 10 parts by mass or less with respect to 100 parts by mass of the inorganic particles.

The toner may contain resin particles (resin particles such as polystyrene, polymethylmethacrylate (PMMA), and melamine resins), a cleaning activator (for example, a metal salt of a higher fatty acid represented by zinc stearate or fluorine-based polymer particles), and the like as external additives.

The content of the inorganic particles (amount of the inorganic particles added to the exterior of the toner particles) with respect to the toner particles is, for example, preferably 0.1% by mass or more and 10% by mass or less, more preferably 18 by mass or more and 8% by mass or less, and even more preferably 2% by mass or more and 6% by mass or less.

Even though the content of the inorganic particles with respect to the toner particles is in the above range, the inorganic particles as an external additive are inhibited from being buried under the toner particles. Therefore, the obtained toner is inhibited from contaminating the inside of a device.

The content of the inorganic particles with respect to the total mass of the external additive is, for example, preferably, 90% by mass or more and 100% by mass or less.

The volume-average particle size of the inorganic particles is, for example, preferably 60 nm or more and 300 nm or less, more preferably 70 nm or more and 200 nm or less, and even more preferably 80 nm or more and 150 nm or less.

In a case where the volume-average particle size of the inorganic particles is 60 nm or more and 300 nm or less, the adhesion between the toner and the inorganic particles is in an appropriate range, which suppresses the burial of the inorganic particles. Therefore, the obtained toner is inhibited from contaminating the inside of a device.

The volume-average particle size of the inorganic particles is measured using a scanning electron microscope.

As the scanning electron microscope, for example, a scanning electron microscope SEM (Scanning Electron Microscope) device (manufactured by Hitachi, Ltd.: S-4100) can be used.

Hereinafter, the procedure for measuring the volume-average particle size of the inorganic particles will be specifically described.

The inorganic particles are observed and imaged with a scanning electron microscope, the image is input into an image analysis device (LUZEXIII, manufactured by NIRECO.), the area of each of the inorganic particles is measured by image analysis, and an equivalent circular diameter is calculated from the area. This equivalent circular diameter is calculated for 100 inorganic particles. Then, the diameter (D50v) taking up 50% in a volume-based cumulative frequency distribution of the obtained equivalent circular diameter is adopted as the volume-average particle size of the inorganic particles.

The magnification of the electron microscope is adjusted so that about 10 or more and 50 or less inorganic particles are projected in one field of view. The equivalent circular diameter of the inorganic particles is determined by combining observation results obtained in a plurality of fields of view.

Characteristics of Toner

Stress Relaxation Time τ

In a case where a strain of 0.005% is applied to the toner at 40° C., a stress relaxation time τ of the toner satisfies 5 seconds$<\tau<$500 seconds.

From the viewpoint of suppressing the occurrence of burial of the external additive caused by the toner deformation, for example, the stress relaxation time τ preferably satisfies 10 seconds$<\tau$, more preferably satisfies 15 seconds$<\tau$, and even more preferably satisfies 20 seconds$<\tau$.

From the viewpoint of further suppressing stress accumulation caused by the rub against a developing sleeve and further suppressing the occurrence of brittle fracture-induced toner surface breakage, for example, the stress relaxation time τ preferably satisfies $\tau<$300 seconds, more preferably satisfies $\tau<$200 seconds, and even more preferably satisfies $\tau<$100 seconds.

The stress relaxation time τ is a value measured using a rheometer.

As the rheometer, for example, "ARES-G2 (trade name)" manufactured by TA Instruments LTD can be used.

Hereinafter, the procedure for measuring the stress relaxation time τ will be specifically described.

The toner as a measurement target is melted by heating at 100° C., thereby preparing a disk-shaped sample having a thickness of 2 mm and a diameter of 8 mm. The disk-shaped sample is sandwiched between parallel plates having a diameter of 8 mm, a strain of 0.005% is applied to the sample at a measurement temperature: 40° C., and the stress is measured over time from the start of application of strain. The stress at the start of application of strain is denoted by $\sigma_o$, and the time elapsed until the stress reaches 0.37 $\sigma_o$ is adopted as the stress relaxation time τ (unit: seconds).

Manufacturing Method of Toner

Next, the manufacturing method of the toner according to the present exemplary embodiment will be described.

The toner according to the present exemplary embodiment is obtained by manufacturing toner particles and then adding external additives to the exterior of the toner particles as necessary.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). The manufacturing method of the toner particles is not particularly limited to these manufacturing methods, and a well-known manufacturing method is adopted.

Among the above methods, for example, the aggregation and coalescence method may be used for obtaining toner particles.

Specifically, for example, in a case where the toner particles are manufactured by the aggregation and coalescence method.

The toner particles are manufactured through a step of preparing a resin particle dispersion in which resin particles to be a binder resin are dispersed and a specific resin particle dispersion to be specific resin particles (a resin particle dispersion-preparing step), a step of allowing the resin particles (plus other particles as necessary) to be aggregated in the resin particle dispersion (having been mixed with another resin particle dispersion as necessary) so as to form aggregated particles (aggregated particle forming step), and a step of heating an aggregated particle dispersion in which the aggregated particles are dispersed so as to allow the aggregated particles to undergo fusion·coalescence and to form toner particles (fusion·coalescence step).

Hereinafter, each of the steps will be specifically described.

In the following section, a method for obtaining toner particles containing a colorant and a release agent will be described. The colorant and the release agent are used as necessary. It goes without saying that other additives different from the colorant and the release agent may also be used.

Resin Particle Dispersion-Preparing Step

First, for example, a colorant particle dispersion in which colorant particles are dispersed and a release agent particle dispersion in which release agent particles are dispersed are prepared together with the resin particle dispersion in which resin particles to be a binder resin are dispersed.

The resin particle dispersion is prepared, for example, by dispersing the resin particles in a dispersion medium by using a surfactant.

Examples of the dispersion medium used for the resin particle dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

One kind of surfactant may be used alone, or two or more kinds of surfactants may be used in combination.

As for the resin particle dispersion, examples of the method for dispersing resin particles in the dispersion medium include general dispersion methods such as a rotary shearing homogenizer, a ball mill having media, a sand mill, and a dyno mill. Depending on the type of resin particles, the resin particles may be dispersed in the resin particle dispersion by using, for example, a transitional phase inversion emulsification method.

The transitional phase inversion emulsification method is a method of dissolving a resin to be dispersed in a hydrophobic organic solvent in which the resin is soluble, adding a base to an organic continuous phase (O phase) for causing neutralization, and then adding an aqueous medium (W phase), so that the resin undergoes conversion (so-called phase transition) from W/O to O/W, turns into a discontinuous phase, and is dispersed in the aqueous medium in the form of particles.

The volume-average particle size of the resin particles dispersed in the resin particle dispersion is, for example, preferably 0.01 μm or more and 1 μm or less, more preferably 0.08 μm or more and 0.8 μm or less, and even more preferably 0.1 μm or more and 0.6 μm or less.

For determining the volume-average particle size of the resin particles, a particle size distribution is measured using a laser diffraction-type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

For example, a colorant particle dispersion and a release agent particle dispersion are prepared in the same manner as that adopted for preparing the resin particle dispersion. That is, the volume-average particle size of particles, the dispersion medium, the dispersion method, and the particle content in the resin particle dispersion are also applied to the colorant particles to be dispersed in the colorant particle dispersion and the release agent particles to be dispersed in the release agent particle dispersion.

Preparation of Specific Resin Particle Dispersion

As a method for preparing the specific resin particle dispersion, for example, known methods such as an emulsion polymerization method, a melt kneading method using a Banbury mixer or a kneader, a suspension polymerization method, and a spray drying method are used. Among these, from the viewpoint of controlling viscoelasticity and controlling dispersion diameter, for example, an emulsion polymerization method is preferable.

From the viewpoint of making the loss coefficient fall into the preferable numerical range, for example, it is preferable to use a styrene-based monomer and a (meth)acrylic monomer as monomers and polymerize these in the presence of a crosslinking agent.

Furthermore, in manufacturing the specific resin particle dispersion, s preferable to perform emulsion polymerization a plurality of times.

Hereinafter, a method for manufacturing the specific resin particle dispersion will be specifically described.

The method for preparing the specific resin particle dispersion preferably includes, for example, a step of obtaining an emulsion containing a monomer, a crosslinking agent, a surfactant, and water (emulsion preparation step), a step of adding a polymerization initiator to the emulsion and heating the emulsion so as to polymerize the monomer (first emulsion polymerization step), and a step of adding an emulsion containing a monomer to a reaction solution obtained after the first emulsion polymerization step and heating the solution so as to polymerize the monomer (second emulsion polymerization step).

In a case where a styrene-based monomer and a (meth) acrylic monomer are used as monomers, for example, it is preferable that the proportion of the styrene-based monomer in the monomers added in the second emulsion polymerization step be lower than the proportion of the styrene-based monomer in the monomers contained in the reaction solution in the first emulsion polymerization step.

In a case where the proportion of the monomers is adjusted as described above, the glass transition temperature is likely to be high on the inside of the specific resin particles but low in the vicinity of the surface of the specific resin particles. In a case where the specific resin particles are in this state, the specific resin particles are more likely to be resin particles in which the loss coefficient tan $\delta_a$ satisfies $0.1<\tan\delta_a<1.0$ and the loss coefficient tan $\delta_b$ satisfies $1.3<\tan\delta_b<3.0$.

Emulsion Preparation Step

This is a step of obtaining an emulsion containing a monomer, a crosslinking agent, a surfactant, and water.

For example, it is preferable to obtain the emulsion by emulsifying a monomer, a crosslinking agent, a surfactant, and water by using an emulsifying machine.

Examples of the emulsifying machine include a rotary stirrer equipped with a propeller type, anchor type, paddle type, or turbine type stirring blade, a stationary mixer such as a static mixer, and a rotor stator type emulsifying machine such as a homogenizer or Clare mix, a mill type emulsifying machine having grinding function, a high-pressure emulsifying machine such as a Munton Gorlin-type pressure emulsifying machine, a high-pressure nozzle type emulsifying machine that causes cavitation under high pressure, a high-pressure impact-type emulsifying machine, such as a microfluidizer, which generates shearing force by causing collision of liquids under high pressure, an ultrasonic emulsifying machine that causes cavitation by using ultrasonic waves, a membrane emulsifying machine that performs uniform emulsification through pores, and the like.

For example, as the monomers, it is preferable to use a styrene-based monomer and a (meth)acrylic monomer.

As the crosslinking agent, the aforementioned crosslinking agent is used.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. The nonionic surfactant may be used in combination with an anionic surfactant or a cationic surfactant. Among these, an anionic surfactant is preferable, for example. One kind of surfactant may be used alone, or two or more kinds of surfactants may be used in combination.

For example, it is preferable that the emulsion contain a chain transfer agent. The chain transfer agent is not particularly limited. As the chain transfer agent, a compound having a thiol component can be used. Specifically, for example, alkyl mercaptans such as hexyl mercaptan, heptyl mercaptan, octyl mercaptan, nonyl mercaptan, decyl mercaptan, and dodecyl mercaptan are preferable.

First Emulsion Polymerization Step

This is a step of adding a polymerization initiator to the emulsion and heating the emulsion so as to polymerize the monomers.

In polymerizing the monomers, for example, it is preferable to stir the emulsion (reaction solution) containing the polymerization initiator with a stirrer.

Examples of the stirrer include a rotary stirrer equipped with a propeller type, anchor type, paddle type, or turbine type stirring blade.

As the polymerization initiator, it is possible to use persulfates such as ammonium persulfate and potassium persulfate, and azo-based radical initiators such as azobisisobutyronitrile (AIBN). As the polymerization initiator, for example, it is preferable to use persulfates.

The content of the monomers with respect to the total mass of the reaction solution is, for example, preferably 10% by mass or more and 30% by mass or less.

For example, from the viewpoint of making the loss coefficient fall into the preferable numerical range, a mass ratio of the styrene-based monomer to the (meth)acrylic monomer in the emulsion (styrene-based monomer/(meth) acrylic monomer) is preferably 3.0 or more and 1.1 or less.

Second Emulsion Polymerization Step

This is a step of adding an emulsion containing monomers to the reaction solution obtained after the first emulsion polymerization step and heating the reaction solution so as to polymerize the monomers.

In polymerizing the monomers, for example, it is preferable to stir the reaction solution as in the first emulsion polymerization step.

For instance, it is preferable to obtain the emulsion containing monomers by emulsifying monomers, a surfactant, and water by using an emulsifying machine.

After the addition of the emulsion containing monomers, the content of the monomers added in this step with respect to the total mass of the reaction solution is, for example, preferably 5% by mass or more and 20% by mass or less.

For example, from the viewpoint of making the loss coefficient fall into the preferable numerical range, in the monomers added in this step, a mass ratio of the styrene-based monomer to the (meth)acrylic monomer in the emulsion (styrene-based monomer/(meth)acrylic monomer) is preferably 0.0 or more and 0.9 or less.

Aggregated Particle Forming Step

Next, the resin particle dispersion is mixed with the colorant particle dispersion, the release agent particle dispersion, and the specific resin particle dispersion.

Then, in the mixed dispersion, the resin particles, the colorant particles, the release agent particles, and the specific resin particles are hetero-aggregated so that aggregated particles are formed which have a diameter close to the diameter of the target toner particles and include the resin particles, the colorant particles, the release agent particles, and the specific resin particles.

Specifically, for example, an aggregating agent is added to the mixed dispersion, the pH of the mixed dispersion is adjusted so that the dispersion is acidic (for example, pH of 2 or higher and 5 or lower), and a dispersion stabilizer is added thereto as necessary. Then, the dispersion is heated to the glass transition temperature of the resin particles (specifically, for example, to a temperature equal to or higher than the glass transition temperature of the resin particles −30° C. and equal to or lower than the glass transition temperature of the resin particles −10° C.) so that the particles dispersed in the mixed dispersion are aggregated, thereby forming aggregated particles.

In the aggregated particle forming step, for example, in a state where the mixed dispersion is being stirred with a rotary shearing homogenizer, an aggregating agent may be added thereto at room temperature (for example, 25° C.), the pH of the mixed dispersion may be adjusted so that the dispersion is acidic (for example, pH of 2 or higher and 5 or lower), a dispersion stabilizer may be added to the dispersion as necessary, and then the dispersion may be heated.

Examples of the aggregating agent include a surfactant having polarity opposite to the polarity of the surfactant used as a dispersant added to the mixed dispersion, an inorganic metal salt, and a metal complex having a valency of 2 or higher. Particularly, in a case where a metal complex is used as the aggregating agent, the amount of the surfactant used is reduced, and the charging characteristics are improved.

An additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA), and the like.

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Fusion·Coalescence Step

The aggregated particle dispersion in which the aggregated particles are dispersed is then heated to, for example, a temperature equal to or higher than the glass transition temperature of the resin particles (for example, a temperature higher than the glass transition temperature of the resin particles by 10° C. to 30° C.) so that the aggregated particles are fused and coalesce, thereby forming toner particles.

Toner particles are obtained through the above steps.

The toner particles may be manufactured through a step of obtaining an aggregated particle dispersion in which the aggregated particles are dispersed, then mixing the aggregated particle dispersion with a resin particle dispersion in which resin particles are dispersed so as to cause the resin particles to be aggregated and adhere to the surface of the aggregated particles and to form second aggregated particles, and a step of heating a second aggregated particle dispersion in which the second aggregated particles are dispersed so as to cause the second aggregated particles to be fused and coalesce and to form toner particles having a core/shell structure.

After the fusion·coalescence step, the toner particles formed in a solution undergo known washing step, solid-liquid separation step, and drying step, thereby obtaining dry toner particles.

As the washing step, in view of charging properties, for example, displacement washing may be thoroughly performed using deionized water. The solid-liquid separation step is not particularly limited. However, in view of productivity, for example, suction filtration, pressure filtration, or the like may be performed. Furthermore, the method of the drying step is not particularly limited. However, for example, in view of productivity, freeze drying, flush drying, fluidized drying, vibratory fluidized drying, or the like may be performed.

Then, for example, by adding an external additive to the obtained dry toner particles and mixing together the external additive and the toner particles, the toner according to the present exemplary embodiment is manufactured. The mixing may be performed, for example, using a V blender, a Henschel mixer, a Lödige mixer, or the like. Furthermore, coarse particles of the toner may be removed as necessary by using a vibratory sieving machine, a pneumatic sieving machine, or the like.

Electrostatic Charge Image Developer

The electrostatic charge image developer according to the present exemplary embodiment contains at least the toner according to the present exemplary embodiment.

The electrostatic charge image developer according to the present exemplary embodiment may be a one-component developer which contains only the toner according to the present exemplary embodiment or a two-component developer which is obtained by mixing together the toner and a carrier.

The carrier is not particularly limited, and examples thereof include known carriers. Examples of the carrier include a coated carrier obtained by coating the surface of a core material consisting of magnetic powder with a coating resin; a magnetic powder dispersion-type carrier obtained by dispersing magnetic powder in a matrix resin and mixing the powder and the resin together; a resin impregnation-type carrier obtained by impregnating porous magnetic powder with a resin; and the like.

Each of the magnetic powder dispersion-type carrier and the resin impregnation-type carrier may be a carrier obtained by coating a core material, which is particles configuring the carrier, with a coating resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like.

The coating resin and the matrix resin may contain other additives such as conductive particles.

Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a coating resin, for example, by a coating method using a solution for forming a coating layer obtained by dissolving the coating resin and various additives, which are used as necessary, in an appropriate solvent, and the like. The solvent is not particularly limited, and may be selected in consideration of the type of the coating resin used, coating suitability, and the like.

Specifically, examples of the resin coating method include a dipping method of dipping the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and removing solvents; and the like.

The mixing ratio (mass ratio) between the toner and the carrier, represented by toner: carrier, in the two-component developer is, for example, preferably 1:100 to 30:100, and more preferably 3:100 to 20:100.

Image Forming Apparatus/Image Forming Method

The image forming apparatus/image forming method according to the present exemplary embodiment will be described.

The image forming apparatus according to the present exemplary embodiment includes an image holder, a charging unit that charges the surface of the image holder, an electrostatic charge image forming unit that forms an electrostatic charge image on the charged surface of the image holder, a developing unit that contains an electrostatic charge image developer and develops the electrostatic charge image formed on the surface of the image holder as a toner image by using the electrostatic charge image developer, a transfer unit that transfers the toner image formed on the surface of the image holder to the surface of a recording medium, and a fixing unit that fixes the toner image transferred to the surface of the recording medium. As the electrostatic charge image developer, the electrostatic charge image developer according to the present exemplary embodiment is used.

In the image forming apparatus according to the present exemplary embodiment, an image forming method (image forming method according to the present exemplary embodiment) is performed which has a charging step of charging the surface of the image holder, an electrostatic charge image forming step of forming an electrostatic charge image on the charged surface of the image holder, a developing step of developing the electrostatic charge image formed on the surface of the image holder as a toner image by using the electrostatic charge image developer according to the present exemplary embodiment, a transfer step of transferring the toner image formed on the surface of the image holder to the surface of a recording medium, and a fixing step of fixing the toner image transferred to the surface of the recording medium.

As the image forming apparatus according to the present exemplary embodiment, known image forming apparatuses are used, such as a direct transfer-type apparatus that transfers a toner image formed on the surface of the image holder directly to a recording medium; an intermediate transfer-type apparatus that performs primary transfer by which the toner image formed on the surface of the image holder is transferred to the surface of an intermediate transfer member and secondary transfer by which the toner image transferred to the surface of the intermediate transfer member is transferred to the surface of a recording medium; an apparatus including a cleaning unit that cleans the surface of the image holder before charging after the transfer of the toner image; and an apparatus including a charge neutralizing unit that neutralizes charge by irradiating the surface of the image holder with charge neutralizing light before charging after the transfer of the toner image.

In the case of the intermediate transfer-type apparatus, as the transfer unit, for example, a configuration is adopted which has an intermediate transfer member with surface on which the toner image will be transferred, a primary transfer unit that performs primary transfer to transfer the toner image formed on the surface of the image holder to the surface of the intermediate transfer member, and a secondary transfer unit that performs secondary transfer to transfer the toner image transferred to the surface of the intermediate transfer member to the surface of a recording medium.

In the image forming apparatus according to the present exemplary embodiment, for example, a portion including the developing unit may be a cartridge structure (process cartridge) to be attached to and detached from the image forming apparatus. As the process cartridge, for example, a process cartridge is used which includes a developing unit that contains the electrostatic charge image developer according to the present exemplary embodiment.

An example of the image forming apparatus according to the present exemplary embodiment will be shown below, but the present invention is not limited thereto. Hereinafter, among the parts shown in the drawing, main parts will be described, and others will not be described.

FIG. 1 is a view schematically showing the configuration of the image forming apparatus according to the present exemplary embodiment.

The image forming apparatus shown in FIG. 1 includes first to fourth image forming units 10Y, 10M, 10C, and 10K (image forming means) adopting an electrophotographic method that output images of colors, yellow (Y), magenta (M), cyan (C), and black (K), based on color-separated image data. These image forming units (hereinafter, simply called "units" in some cases) 10Y, 10M, 10C, and 10K are arranged in a row in the horizontal direction in a state of being spaced apart by a predetermined distance. The units 10Y, 10M, 10C, and 10K may be process cartridges that are attached to and detached from the image forming apparatus.

An intermediate transfer belt 20 as an intermediate transfer member passing through the units 10Y, 10M, 10C, and 10K extends above the units in the drawing. The intermediate transfer belt 20 is looped over a driving roll 22 and a support roll 24 which is in contact with the inner surface of the intermediate transfer belt 20, the rolls 22 and 24 being spaced apart in the horizontal direction in the drawing. The intermediate transfer belt 20 is designed to run in a direction toward the fourth unit 10K from the first unit 10Y. Force is applied to the support roll 24 in a direction away from the driving roll 22 by a spring or the like (not shown in the drawing). Tension is applied to the intermediate transfer belt 20 looped over the two rolls. An intermediate transfer member cleaning device 30 facing the driving roll 22 is provided on the surface of the intermediate transfer belt 20 on the image holder side.

Toners including toners of four colors, yellow, magenta, cyan, and black, stored in toner cartridges 8Y, 8M, 8C, and 8K are supplied to developing devices (developing units) 4Y, 4M, 4C, and 4K of units 10Y, 10M, 10C, and 10K, respectively.

The first to fourth units 10Y, 10M, 10C, and 10K have the same configuration. Therefore, in the present specification, as a representative, the first unit 10Y will be described which is placed on the upstream side of the running direction of the intermediate transfer belt and forms a yellow image. Reference numerals marked with magenta (M), cyan (C), and black (K) instead of yellow (Y) are assigned in the same portions as these in the first unit 10Y, so that the second to fourth units 10M, 10C, and 10K will not be described again.

The first unit 10Y has a photoreceptor 1Y that acts as an image holder. Around the photoreceptor 1Y, a charging roll 2Y (an example of charging unit) that charges the surface of the photoreceptor 1Y at a predetermined potential, an exposure device 3 (an example of electrostatic charge image forming unit) that exposes the charged surface to a laser beam 3Y based on color-separated image signals so as to form an electrostatic charge image, a developing device 4Y (an example of developing unit) that develops the electrostatic charge image by supplying a charged toner to the electrostatic charge image, a primary transfer roll 5Y (an example of primary transfer unit) that transfers the developed toner image onto the intermediate transfer belt 20, and a photoreceptor cleaning device 6Y (an example of cleaning unit) that removes the residual toner on the surface of the photoreceptor 1Y after the primary transfer are arranged in this order.

The primary transfer roll 5Y is disposed on the inner side of the intermediate transfer belt 20, at a position facing the photoreceptor 1Y. Furthermore, a bias power supply (not shown in the drawing) for applying a primary transfer bias is connected to each of primary transfer rolls 5Y, 5M, 5C, and 5K. Each bias power supply varies the transfer bias applied to each primary transfer roll under the control of a control unit not shown in the drawing.

Hereinafter, the operation that the first unit 10Y carries out to form a yellow image will be described.

First, prior to the operation, the surface of the photoreceptor 1Y is charged to a potential of −600 V to −800 V by the charging roll 2Y.

The photoreceptor 1Y is formed of a photosensitive layer laminated on a conductive (for example, volume resistivity at 20° C.: $1\times10^{-6}$ Ωcm or less) substrate. The photosensitive layer has properties in that although this layer usually has a high resistance (resistance of a general resin), in a case where it is irradiated with the laser beam 3Y, the specific resistance of the portion irradiated with the laser beam changes. Therefore, via an exposure device 3, the laser beam 3Y is output to the surface of the charged photoreceptor 1Y according to the image data for yellow transmitted from the control unit not shown in the drawing. The laser beam 3Y is radiated to the photosensitive layer on the surface of the photoreceptor 1Y. As a result, an electrostatic charge image of a yellow image pattern is formed on the surface of the photoreceptor 1Y.

The electrostatic charge image is an image formed on the surface of the photoreceptor 1Y by charging. It is a so-called negative latent image formed in a manner in which the charges with which the surface of the photoreceptor 1Y is charged flow due to the reduction in the specific resistance of the portion of the photosensitive layer irradiated with the laser beam 3Y, but the charges in a portion not being irradiated with the laser beam 3Y remain.

The electrostatic charge image formed on the photoreceptor 1Y is rotated to a predetermined development position as the photoreceptor 1Y runs. At the development position, the electrostatic charge image on the photoreceptor 1Y turns in to visible image (developed image) as a toner image by the developing device 4Y.

The developing device 4Y contains, for example, an electrostatic charge image developer that contains at least a yellow toner and a carrier. By being stirred in the developing device 4Y, the yellow toner undergoes triboelectrification, carries charges of the same polarity (negative charge) as the charges with which the surface of the photoreceptor 1Y is charged, and is held on a developer roll (an example of a developer holder). Then, as the surface of the photoreceptor 1Y passes through the developing device 4Y, the yellow toner electrostatically adheres to the neutralized latent image portion on the surface of the photoreceptor 1Y, and the latent image is developed by the yellow toner. The photoreceptor 1Y on which the yellow toner image is formed keeps on running at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and electrostatic force heading for the primary transfer roll 5Y from the photoreceptor 1Y acts on the toner image. As a result, the toner image on the photoreceptor 1Y is transferred onto the intermediate transfer belt 20. The transfer bias applied at this time has a polarity (+) opposite to the polarity (−) of the toner. For example, in the first unit 10Y, the transfer bias is set to +10 μA under the control of the control unit (not shown in the drawing).

Meanwhile, the residual toner on the photoreceptor 1Y is removed by a photoreceptor cleaning device 6Y and collected.

Furthermore, the primary transfer bias applied to the primary transfer rolls 5M, 5C, and 5K following the second unit 10M is also controlled according to the first unit.

In this way, the intermediate transfer belt 20 to which the yellow toner image is transferred in the first unit 10Y is sequentially transported through the second to fourth units 10M, 10C, and 10K, and the toner images of each color are superposed and transferred in layers.

The intermediate transfer belt 20, to which the toner images of four colors are transferred in layers through the first to fourth units, reaches a secondary transfer portion configured with the intermediate transfer belt 20, the support roll 24 in contact with the inner surface of the intermediate transfer belt, and a secondary transfer roll 26 (an example of secondary transfer unit) disposed on the image holding surface side of the intermediate transfer belt 20. Meanwhile, via a supply mechanism, recording paper P (an example of recording medium) is supplied at a predetermined timing to the gap between the secondary transfer roll 26 and the intermediate transfer belt 20 that are in contact with each other. Furthermore, secondary transfer bias is applied to the support roll 24. The transfer bias applied at this time has the same polarity (−) as the polarity (−) of the toner. The electrostatic force heading for the recording paper P from the intermediate transfer belt 20 acts on the toner image, which makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

Then, the recording paper P is transported into a pressure contact portion (nip portion) of a pair of fixing rolls in the fixing device 28 (an example of fixing unit), the toner image is fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet and the like, in addition to the recording paper P.

In order to further improve the smoothness of the image surface after fixing, for example, it is preferable that the surface of the recording paper P be also smooth, although the recording paper P is not particularly limited. For instance, coated paper prepared by coating the surface of plain paper with a resin or the like, art paper for printing, and the like are used.

The recording paper P on which the color image has been fixed is transported to an output portion, and a series of color image forming operations is finished.

Process Cartridge/Toner Cartridge

The process cartridge to the present exemplary embodiment will be described.

The process cartridge according to the present exemplary embodiment includes a developing unit which contains the electrostatic charge image developer according to the present exemplary embodiment and develops an electrostatic charge image formed on the surface of an image holder as a toner image by using the electrostatic charge image developer. The process cartridge is detachable from the image forming apparatus.

The process cartridge according to the present exemplary embodiment is not limited to the above configuration. The process cartridge may be configured with a developing device and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawing, main parts will be described, and others will not be described.

Figure 2:
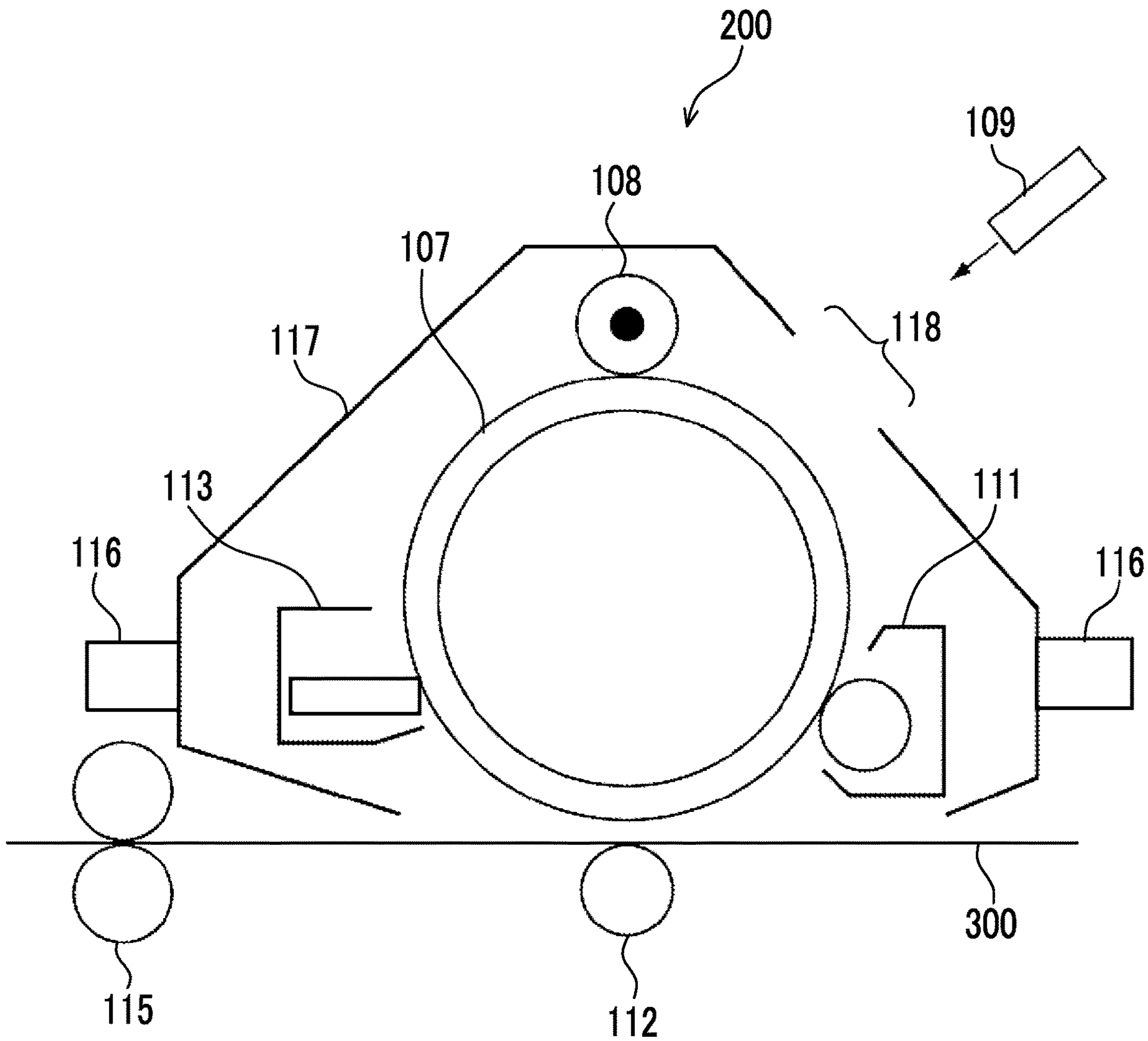

FIG. 2 is a view schematically showing the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of image holder), a charging roll 108 (an example of charging unit) that is provided on the periphery of the photoreceptor 107, a developing device 111 (an example of developing unit), a photoreceptor cleaning device 113 (an example of cleaning unit), which are integrally combined and held in the housing 117. The process cartridge 200 forms a cartridge in this way.

In FIG. 2, 109 represents an exposure device (an example of electrostatic charge image forming unit), 112 represents a transfer device (an example of transfer unit), 115 represents a fixing device (an example of fixing unit), and 300 represents recording paper (an example of recording medium).

Next, the toner cartridge according to the present exemplary embodiment will be described.

The toner cartridge according to the present exemplary embodiment is a toner cartridge including a container that contains the toner according to the present exemplary embodiment and is detachable from the image forming apparatus. The toner cartridge includes a container that contains a replenishing toner to be supplied to the developing unit provided in the image forming apparatus.

The image forming apparatus shown in FIG. 1 is an image forming apparatus having a configuration that enables toner cartridges 8Y, 8M, 8C, and 8K to be detachable from the apparatus. The developing devices 4Y, 4M, 4C, and 4K are connected to toner cartridges corresponding to the respective developing devices (colors) by a toner supply pipe not shown in the drawing. In a case where the amount of the toner contained in the container of the toner cartridge is low, the toner cartridge is replaced.

EXAMPLES

Examples will be described below, but the present invention is not limited to these examples. In the following description, unless otherwise specified, "parts" and "%" are based on mass in all cases.

Preparation of Amorphous Resin Particle Dispersion 1

Terephthalic acid 98 parts by mol
Trimellitic anhydride: 2 parts by mol
Ethylene oxide (2 mol) adduct of bisphenol A: 20 parts by mol
Propylene oxide (2 mol) adduct of bisphenol A: 80 parts by mol The above materials are put in a reactor equipped with a stirrer, a nitrogen introduction tube, a temperature sensor, and a rectifying column, the temperature is raised to 190° C. for 1 hour, and dibutyltin oxide is added thereto in an amount of 1.2 parts with respect to 100 parts of the above materials. While the generated water is being distilled off, the temperature is raised to 240° C. for 6 hours, a dehydrocondensation reaction is continued for 3 hours in the reaction solution kept at 240° C., and then the reactant is cooled.

The molten reactant is transferred as it is to CAVITRON CD1010 (manufactured by Eurotech Ltd.) at a rate of 100 g/min. At the same time, separately prepared aqueous ammonia having a concentration of 0.37% by mass is transferred to CAVITRON CD1010 at a rate of 0.1 L/min in a state of being heated at 120° C. with a heat exchanger. CAVITRON CD1010 is operated under the conditions of a rotation speed of a rotor of 60 Hz and a pressure of 5 $kg/cm^2$, thereby obtaining a resin particle dispersion in which resin particles having a volume-average particle size of 160 nm. Deionized water is added to the resin particle dispersion, and the solid content thereof is adjusted to 20% by mass, thereby obtaining an amorphous resin particle dispersion 1.

Preparation of Amorphous Resin Particle Dispersions 2 and 3

Amorphous resin particle dispersions 2 and 3 are prepared in the same manner as that adopted for preparing the amorphous resin particle dispersion 1, except that the materials added to the reactor are changed as follows.

Amorphous Resin Particle Dispersion 2

Terephthalic acid 98 parts by mol
Fumaric acid/trimellitic anhydride: 2 parts by mol
Ethylene oxide (2 mol) adduct of bisphenol A: 20 parts by mol
Propylene oxide (3 mol) adduct of bisphenol A: 80 parts by mol Amorphous Resin Particle Dispersion 3

Terephthalic acid 98 parts by mol.
Trimellitic anhydride: 2 parts by mol
Propylene oxide (2 mol) adduct of bisphenol A: 100 parts by mol Preparation of Crystalline Resin Particle Dispersion 1,10-Dodecanedioic acid: 225 parts by mass
1,10-Dodecanediol: 174 parts by mass The above materials are put in a reactor equipped with a stirrer, a nitrogen introduction tube, a temperature sensor, and a rectifying column, the temperature is raised to 160° C. for 1 hour, and 0.8 parts by mass of dibutyltin oxide is added thereto. While the generated water is being distilled off, the temperature is raised to 180° C. for 6 hours, a dehydrocondensation reaction is continued for 5 hours at a temperature kept at 180° C. Then, the temperature is slowly raised to 230° C. under reduced pressure, and the reaction solution is stirred for 2 hours in a state of being kept at 230° C. Thereafter, the reactant is cooled. After cooling, solid-liquid separation is performed, and the solids are dried, thereby obtaining a crystalline polyester resin.

Crystalline polyester resin: 100 parts
Methyl ethyl ketone: 40 parts
Isopropyl alcohol: 30 parts
10% aqueous ammonia solution: 6 parts The above materials are put in a 3 L jacketed reaction vessel (manufactured by EYELA: BJ-30N) equipped with a condenser, a thermometer, a water dripping device, and an anchor blade. In a state where the reaction vessel is being kept at 80° C. in a water circulation-type thermostatic bath, and the materials are being stirred and mixed together at 100 rpm, the resin is dissolved. Then, the water circulation-type thermostatic bath is set to 50° C., and a total of 400 parts of deionized water kept at 50° C. is added dropwise thereto at a rate of 7 parts by mass/min so that phase transition occurs, thereby obtaining an emulsion. The obtained emulsion (576 parts by mass) and 500 parts by mass of deionized water are put in a 2 L eggplant flask and set in an evaporator (manufactured by EYELA) equipped with a vacuum controlled unit via a trap ball. While being rotated, the eggplant flask is heated in a hot water bath at 60° C., and the pressure is reduced to 7 kPa with care to sudden boiling, thereby removing the solvent. Then, deionized water is added thereto, thereby obtaining a crystalline resin particle dispersion having a solid content concentration of 20% by mass.

Preparation of Specific Resin Particle Dispersion 1

Preparation of Emulsion A

Styrene: 48.9 parts
n-Butyl acrylate: 35 parts
Divinylbenzene: 1 part
Dodecanethiol: 0.1 parts The above materials are added to a mixing vessel equipped with a stirrer and stirred. A mixed solution of 1.0 part of an anionic surfactant (SS-H manufactured by Kao Corporation.) and 60 parts of deionized water is added to a mixing vessel and stirred, thereby obtaining an emulsion A.

Preparation of Emulsion B

Emulsion A: 66 parts
n-Butyl acrylate: 15 parts

The above materials are added to a mixing vessel equipped with a stirrer and stirred, thereby preparing an emulsion B.

Preparation of Specific Resin Particle Dispersion

An anionic surfactant (SS-H manufactured by Kao Corporation., 1.0 part) and 90 parts of deionized water are added to a reactor equipped with a stirrer and a nitrogen introduction tube and stirred. The emulsion A (80 parts) is added thereto, and 10 parts of an aqueous ammonium persulfate solution having a concentration of 10% by mass is further added thereto.

The reactor is cleaned out by nitrogen purging, the reaction solution is heated in an oil bath while being stirred so that the temperature of the reaction solution reaches 70° C. The reaction solution is stirred for 2 hours while being kept at the same temperature, thereby performing emulsion polymerization.

Thereafter, the entirety of the emulsion B is added to the reactor, the reaction solution is heated in an oil bath while being stirred so that the temperature of the reaction solution reaches 70° C., emulsion polymerization is carried out by stirring the reaction solution for 3 hours in a state where the temperature of the reaction solution is being maintained, and then the reaction solution is cooled to room temperature, thereby preparing a specific resin particle dispersion 1.

Preparation of Specific Resin Particle Dispersions 2 to 33

Specific resin particle dispersions 2 to 33 are prepared in the same manner as that adopted for preparing the specific resin particle dispersion 1, except that the type of the (meth)acrylic monomer added for preparing the emulsion A and the amount of the styrene, (meth)acrylic monomer, divinylbenzene, dodecanethiol, and anionic surfactant added are changed as shown in Table 1, the type of the (meth) acrylic monomer added for preparing the emulsion B and the amount of the styrene and (meth)acrylic monomer added are changed as shown in Table 1, and the amount of the aqueous ammonium persulfate solution added for preparing the specific resin particle dispersion and the temperature of the reaction solution are changed as shown in Table 1.

TABLE 1-1

| | Emulsion A | | | | | | Emulsion B | | | Amount of | |
|---|---|---|---|---|---|---|---|---|---|---|---|
| Type of specific resin particle dispersion | Amount of styrene added (parts) | Type of (meth) acrylic monomer | Amount of (meth) acrylic monomer added (parts) | Amount of divinyl benzene added (parts) | Amount of dodecane thiol added (parts) | Amount of anionic surfactant added (parts) | Amount of styrene added (parts) | Type of (meth) acrylic monomer | Amount of (meth) acrylic monomer added (parts) | aqueous ammonium persulfate solution added (parts) | Reaction temperature (° C.) |
| 1 | 48.9 | n-Butyl acrylate | 35.0 | 1.0 | 0.1 | 1.00 | 0.0 | n-Butyl acrylate | 15.0 | 10 | 70 |
| 2 | 48.9 | n-Butyl acrylate | 35.0 | 1.0 | 0.1 | 1.00 | 0.0 | n-Butyl acrylate | 15.0 | 10 | 60 |
| 3 | 48.9 | n-Butyl acrylate | 35.0 | 1.0 | 0.1 | 1.00 | 0.0 | n-Butyl acrylate | 15.0 | 13 | 80 |
| 4 | 48.9 | n-Butyl acrylate | 35.0 | 1.0 | 0.1 | 1.00 | 0.0 | n-Butyl acrylate | 15.0 | 7 | 60 |
| 5 | 48.9 | n-Butyl acrylate | 35.0 | 1.0 | 0.3 | 1.00 | 0.0 | n-Butyl acrylate | 15.0 | 15 | 80 |
| 6 | 48.9 | n-Butyl acrylate | 35.0 | 1.0 | 0.1 | 1.00 | 0.0 | n-Butyl acrylate | 15.0 | 3 | 60 |
| 7 | 48.9 | n-Butyl acrylate | 35.0 | 1.0 | 0.7 | 1.00 | 0.0 | n-Butyl acrylate | 15.0 | 15 | 80 |
| 8 | 48.9 | n-Butyl acrylate | 25.0 | 1.0 | 0.1 | 1.00 | 0.0 | n-Butyl acrylate | 25.0 | 10 | 70 |
| 9 | 48.9 | n-Butyl acrylate | 45.0 | 1.0 | 0.1 | 1.00 | 0.0 | n-Butyl acrylate | 5.0 | 10 | 70 |
| 10 | 48.9 | n-Butyl acrylate | 22.0 | 1.0 | 0.1 | 1.00 | 0.0 | n-Butyl acrylate | 28.0 | 10 | 70 |
| 11 | 48.9 | n-Butyl acrylate | 50.0 | 1.0 | 0.1 | 1.00 | 0.0 | n-Butyl acrylate | 0.0 | 10 | 70 |
| 12 | 48.9 | n-Butyl acrylate | 20.0 | 1.0 | 0.1 | 1.00 | 0.0 | n-Butyl acrylate | 30.0 | 10 | 70 |
| 13 | 43.9 | n-Butyl acrylate | 50.0 | 1.0 | 0.1 | 1.00 | 5.0 | n-Butyl acrylate | 0.0 | 10 | 70 |
| 14 | 44.0 | n-Butyl acrylate | 39.9 | 1.0 | 0.1 | 1.00 | 0.0 | n-Butyl acrylate | 15.0 | 10 | 70 |

TABLE 1-1-continued

| Type of specific resin particle dispersion | Emulsion A: Amount of styrene added (parts) | Emulsion A: Type of (meth) acrylic monomer | Emulsion A: Amount of (meth) acrylic monomer added (parts) | Emulsion A: Amount of divinyl benzene added (parts) | Emulsion A: Amount of dodecane thiol added (parts) | Emulsion A: Amount of anionic surfactant added (parts) | Emulsion B: Amount of styrene added (parts) | Emulsion B: Type of (meth) acrylic monomer | Emulsion B: Amount of (meth) acrylic monomer added (parts) | Amount of aqueous ammonium persulfate solution added (parts) | Reaction temperature (° C.) |
|---|---|---|---|---|---|---|---|---|---|---|---|
| 15 | 55.0 | n-Butyl acrylate | 28.9 | 1.0 | 0.1 | 1.00 | 0.0 | n-Butyl acrylate | 15.0 | 10 | 70 |
| 16 | 39.0 | n-Butyl acrylate | 44.9 | 1.0 | 0.1 | 1.00 | 0.0 | n-Butyl acrylate | 15.0 | 10 | 70 |
| 17 | 58.5 | n-Butyl acrylate | 25.4 | 1.0 | 0.1 | 1.00 | 0.0 | n-Butyl acrylate | 15.0 | 10 | 70 |

TABLE 1-2

| Type of specific resin particle dispersion | Emulsion A: Amount of styrene added (parts) | Emulsion A: Type of (meth) acrylic monomer | Emulsion A: Amount of (meth) acrylic monomer added (parts) | Emulsion A: Amount of divinyl benzene added (parts) | Emulsion A: Amount of dodecane thiol added (parts) | Emulsion A: Amount of anionic surfactant added (parts) | Emulsion B: Amount of styrene added (parts) | Emulsion B: Type of (meth) acrylic monomer | Emulsion B: Amount of (meth) acrylic monomer added (parts) | Amount of aqueous ammonium persulfate solution added (parts) | Reaction temperature (° C.) |
|---|---|---|---|---|---|---|---|---|---|---|---|
| 18 | 38.9 | n-Butyl acrylate | 45.0 | 1.0 | 0.1 | 1.00 | 0.0 | n-Butyl acrylate | 15.0 | 10 | 70 |
| 19 | 58.9 | n-Butyl acrylate | 25.0 | 1.0 | 0.1 | 1.00 | 0.0 | n-Butyl acrylate | 15.0 | 10 | 70 |
| 20 | 48.9 | n-Butyl acrylate | 35.0 | 0.0 | 0.1 | 1.00 | 0.0 | n-Butyl acrylate | 15.0 | 10 | 70 |
| 21 | 0.0 | n-Butyl methacrylate | 83.9 | 1.0 | 0.1 | 1.00 | 0.0 | n-Butyl methacrylate | 15.0 | 10 | 70 |
| 22 | 48.9 | n-Butyl acrylate | 35.0 | 1.0 | 0.1 | 5.00 | 0.0 | n-Butyl acrylate | 15.0 | 10 | 70 |
| 23 | 48.9 | n-Butyl acrylate | 35.0 | 1.0 | 0.1 | 0.10 | 0.0 | n-Butyl acrylate | 15.0 | 10 | 70 |
| 24 | 48.9 | n-Butyl acrylate | 35.0 | 1.0 | 0.1 | 5.40 | 0.0 | n-Butyl acrylate | 15.0 | 10 | 70 |
| 25 | 48.9 | n-Butyl acrylate | 35.0 | 1.0 | 0.1 | 0.09 | 0.0 | n-Butyl acrylate | 15.0 | 10 | 70 |
| 26 | 53.9 | Stearyl methacrylate | 30.0 | 1.0 | 0.1 | 1.00 | 0.0 | Stearyl methacrylate | 15.0 | 10 | 70 |
| 27 | 27.9 | Cyclohexyl acrylate | 56.0 | 1.0 | 0.1 | 1.00 | 0.0 | Cyclohexyl acrylate | 15.0 | 10 | 70 |
| 28 | 27.9 | Lauryl methacrylate | 56.0 | 1.0 | 0.1 | 1.00 | 0.0 | Lauryl methacrylate | 15.0 | 10 | 70 |
| 29 | 21.9 | Cyclohexyl acrylate | 62.0 | 1.0 | 0.1 | 1.00 | 0.0 | Cyclohexyl acrylate | 15.0 | 10 | 70 |
| 30 | 48.9 | n-Butyl acrylate | 35.0 | 1.0 | 0.1 | 1.00 | 0.0 | n-Butyl acrylate | 15.0 | 2.5 | 60 |
| 31 | 48.9 | n-Butyl acrylate | 35.0 | 1.0 | 0.7 | 1.00 | 0.0 | n-Butyl acrylate | 15.0 | 15 | 80 |
| 32 | 48.9 | n-Butyl acrylate | 18.5 | 1.0 | 0.1 | 1.00 | 0.0 | n-Butyl acrylate | 30.5 | 10 | 70 |
| 33 | 38.9 | n-Butyl acrylate | 50.0 | 1.0 | 0.1 | 1.00 | 10.0 | n-Butyl acrylate | 0.0 | 10 | 70 |

Preparation of Colorant Dispersion

Carbon black (Regal 330, manufactured by Cabot Corporation) 50 parts

Anionic surfactant (NEOGEN RK, manufactured by DKS Co. Ltd.): 5 parts

Deionized water: 192.9 parts

The above components are mixed together and treated with ULTIMAIZER (manufactured by SUGINO MACHINE LIMITED) at 240 MPa for 10 minutes, thereby preparing a colorant dispersion (solid content: 20%).

Preparation of Release Agent Dispersion

Fischer-Tropsch wax (FNP0090, manufactured by NIPPON SEIRO CO., LTD., melting temperature Tw: 90° C.): 50 parts.

Anionic surfactant (NEOGEN RK, manufactured by DKS Co. Ltd.): 1 part

Deionized water 200 parts

The above materials are mixed together, heated to 130° C., and dispersed using a homogenizer (ULTRA-TURRAX T50 manufactured by IKA). Then, by using Munton Gorlin high-pressure homogenizer (manufactured by Gorlin), dispersion treatment is performed, thereby obtaining a release agent dispersion (solid content of 20% by mass) in which release agent particles are dispersed. The volume-average particle size of the release agent particles is 180 nm.

Example 1

Amorphous resin particle dispersion 1:170 parts

Crystalline resin particle dispersion: 56 parts

Specific resin particle dispersion 1:60 parts

Colorant dispersion: 40 parts

Release agent dispersion: 25 parts

Deionized water: 250 parts

The above materials (materials for preparation) are put in a reactor equipped with a thermometer, a pH meter, and a stirrer, heated to a temperature of 30° C. from the outside with a mantle heater, and kept as it is for 30 minutes while being stirred at a rotation speed of 150 rpm. Thereafter, a 0.3N aqueous nitric acid solution is added thereto so that the pH is adjusted to 3.0, and then a 3% by mass aqueous polyaluminum chloride solution is added thereto in a state where the reaction solution is being dispersed with a homogenizer (ULTRA-TURRAX T50 manufactured by IKA). Then, in a state where the reaction solution is being stirred, the temperature thereof is raised to 50° C. and kept for 30 minutes. Subsequently, 1, 149 parts of the amorphous resin particle dispersion is added thereto, the reaction solution is kept as it is for 1 hour, a 0.1N aqueous sodium hydroxide solution is added thereto so that the pH is adjusted to 8.5, and the reaction solution is then heated to 85° C. while being continuously stirred and kept as it is for 5 hours. Thereafter, cooling, solid-liquid separation, washing and drying of the solids are sequentially carried out, thereby obtaining toner particles having a volume-average particle size of 4.8 μm.

The obtained toner particles (100 parts) and 3.5 parts of hydrophobic silica 1 (manufactured by Shin-Etsu Chemical Co., Ltd., X24-9163A, volume-average particle size 120 nm) as inorganic particles are mixed together by a Henschel mixer, thereby obtaining a toner.

Then, 8 parts of the obtained toner and 100 parts of the following carrier are mixed together, thereby obtaining a developer.

Preparation of Carrier

Ferrite particles (average particle size 35 μm) 100 parts

Toluene 14 parts

Styrene-methyl methacrylate copolymer (copolymerization ratio 15/85) 3 parts

Carbon black 0.2 parts

The above components excluding the ferrite particles are dispersed with a sand mill, thereby preparing a dispersion. The dispersion is put in a vacuum deaeration-type kneader together with the ferrite particles, and dried under reduced pressure while being stirred, thereby obtaining a carrier.

Examples 2 to 25

Toner particles, a toner, and a developer of each example are obtained in the same manner as in Example 1, except that the specific resin particle dispersion 1 is changed to the amorphous resin particle dispersion and the specific resin particle dispersion described in Table 2.

Examples 26 to 31

Toner particles, a toner, and a developer are obtained in the same manner as in Example 1, except that the amounts of the amorphous resin particle dispersion 1, the crystalline resin particle dispersion, and the specific resin particle dispersion 1 added as the materials for preparation are changed as follows.

Example 26

Amorphous resin particle dispersion 1:199.5 parts
Crystalline resin particle dispersion 1:61.5 parts
Specific resin particle dispersion 1:25 parts Example 27

Amorphous resin particle dispersion 1:136 parts
Crystalline resin particle dispersion: 50 parts
Specific resin particle dispersion 1:100 parts Example 28

Amorphous resin particle dispersion 1:215.6 parts
Crystalline resin particle dispersion: 64.4 parts
Specific resin particle dispersion 1:6 parts Example 29

Amorphous resin particle dispersion 1:102 parts
Crystalline resin particle dispersion: 44 parts
Specific resin particle dispersion 1:140 parts Example 30

Amorphous resin particle dispersion 1:217 parts
Crystalline resin particle dispersion: 65 parts
Specific resin particle dispersion 1:45 parts Example 31

Amorphous resin particle dispersion 1:89 parts
Crystalline resin particle dispersion: 42 parts
Specific resin particle dispersion 1:155 parts Examples 32 to 35

Toner particles, a toner, and a developer of each example are obtained in the same manner as in Example 1, except that the specific resin particle dispersion 1 is changed to the specific resin particle dispersion described in Table 2.

Examples 36 to 39

Toner particles, a toner, and a developer of each example are obtained in the same manner as in Example 1, except that the amount of inorganic particles added for preparing the toner is changed to 0.15 parts in Example 36, 9.9 parts in Example 37, 0.09 parts in Example 38, and 10.1 parts in Example 39.

Examples 40 to 43

Toner particles, a toner, and a developer of each example are obtained in the same manner as in Example 1, except that the type of inorganic particles added for preparing the toner is changed as follows.

Example 40

Hydrophobic silica 2 as inorganic particles (manufactured by Shin-Etsu Chemical Co., Ltd., X24-9404, volume-average particle size 63 nm)

Example 41

Hydrophobic silica 3 as inorganic particles (manufactured by Shin-Etsu Chemical Co., Ltd., QCB-100, volume-average particle size 298 nm)

Example 42

Hydrophobic silica 4 as inorganic particles (manufactured by Shin-Etsu Chemical Co., Ltd., X24-9404, volume-average particle size 58 nm)·

Example 43

Hydrophobic silica 5 as inorganic particles (manufactured by Shin-Etsu Chemical Co., Ltd., QCB-100, volume-average particle size 305 nm)

Examples 44 to 49

Toner particles, a toner, and a developer are obtained in the same manner as in Example 1, except that the amounts of the amorphous resin particle dispersion 1 and the crystalline resin particle dispersion added as the materials for preparation are changed as follows.

Example 44

Amorphous resin particle dispersion 1:113.5 parts
Crystalline resin particle dispersion: 112.5 parts

Example 45

Amorphous resin particle dispersion 1:199.7 parts
Crystalline resin particle dispersion: 26.3 parts

Example 46

Amorphous resin particle dispersion 1:76 parts
Crystalline resin particle dispersion: 150 parts

Example 47

Amorphous resin particle dispersion 1:207.3 parts
Crystalline resin particle dispersion: 18.7 parts

Example 48

Amorphous resin particle dispersion 1:38.5 parts
Crystalline resin particle dispersion: 187.5 parts

Example 49

Amorphous resin particle dispersion 1:226 parts
Crystalline resin particle dispersion: 0 parts

Comparative Examples 1 to 4

Toner particles, a toner, and a developer of each example are obtained in the same manner as in Example 1, except that the specific resin particle dispersion 1 is changed to the specific resin particle dispersion described in Table 2.

Comparative Example 5

Toner particles, a toner, and a developer are obtained in the same manner as in Example 1, except that the amorphous resin particle dispersion is changed to the amorphous resin particle dispersion 2, and the amounts of the amorphous resin dispersion and the crystalline resin particle dispersion added as the materials for preparation are changed as follows.

Amorphous resin particle dispersion 2:38.5 parts
Crystalline resin particle dispersion: 187.5 parts

Comparative Example 6

Toner particles, a toner, and a developer are obtained in the same manner as in Example 1, except that the amorphous resin particle dispersion is changed to the amorphous resin particle dispersion 3, and the amounts of the amorphous resin dispersion and the crystalline resin particle dispersion added as the materials for preparation are changed as follows.

Amorphous resin particle dispersion 3:226 parts
Crystalline resin particle dispersion: 0 parts Evaluation on Internal Contamination of Developing Device The developer obtained in each example is added to the developing device of a printer B9136 manufactured by FUJIFILM Business Innovation Corp., and 10,000 images with an image density of 1% are printed in an environment at 30° C. and 50% RH. Then, 100 images with an image density of 50% are printed, a site of the developing device that contains the developer is visually checked and evaluated based on the following evaluation criteria.

Evaluation Criteria

A: Contamination is not recognizable.
B: Slight contamination is recognizable.
C: Contamination is recognizable but is acceptable.
D: Apparent contamination is recognized and unacceptable.

TABLE 2-1

| | Type of amorphous resin particle dispersion | Type of specific resin particle dispersion |
|---|---|---|
| Example 1 | 1 | 1 |
| Example 2 | 1 | 2 |
| Example 3 | 1 | 3 |
| Example 4 | 1 | 4 |
| Example 5 | 1 | 5 |
| Example 6 | 1 | 6 |
| Example 7 | 1 | 7 |
| Example 8 | 1 | 8 |
| Example 9 | 1 | 9 |
| Example 10 | 1 | 10 |
| Example 11 | 1 | 11 |
| Example 12 | 1 | 12 |
| Example 13 | 1 | 13 |
| Example 14 | 1 | 14 |
| Example 15 | 1 | 15 |
| Example 16 | 1 | 16 |
| Example 17 | 1 | 17 |
| Example 18 | 1 | 18 |
| Example 19 | 1 | 19 |
| Example 20 | 1 | 20 |
| Example 21 | 1 | 21 |
| Example 22 | 1 | 22 |
| Example 23 | 1 | 23 |
| Example 24 | 1 | 24 |
| Example 25 | 1 | 25 |
| Example 26 | 1 | 1 |
| Example 27 | 1 | 1 |
| Example 28 | 1 | 1 |

TABLE 2-2

| | Type of amorphous resin particle dispersion | Type of specific resin particle dispersion |
|---|---|---|
| Example 29 | 1 | 1 |
| Example 30 | 1 | 1 |
| Example 31 | 1 | 1 |
| Example 32 | 1 | 26 |
| Example 33 | 1 | 27 |
| Example 34 | 1 | 28 |
| Example 35 | 1 | 29 |
| Example 36 | 1 | 1 |
| Example 37 | 1 | 1 |
| Example 38 | 1 | 1 |
| Example 39 | 1 | 1 |
| Example 40 | 1 | 1 |
| Example 41 | 1 | 1 |
| Example 42 | 1 | 1 |
| Example 43 | 1 | 1 |

TABLE 2-2-continued

| | Type of amorphous resin particle dispersion | Type of specific resin particle dispersion |
|---|---|---|
| Example 44 | 1 | 1 |
| Example 45 | 1 | 1 |
| Example 46 | 1 | 1 |
| Example 47 | 1 | 1 |
| Example 48 | 1 | 1 |
| Example 49 | 1 | 1 |
| Comparative Example 1 | 1 | 30 |
| Comparative Example 2 | 1 | 31 |
| Comparative Example 3 | 1 | 32 |
| Comparative Example 4 | 1 | 33 |
| Comparative Example 5 | 2 | 1 |
| Comparative Example 6 | 3 | 1 |

TABLE 3-1

| | Toner | | | | | | | | | | | | |
|---|---|---|---|---|---|---|---|---|---|---|---|---|---|
| | Specific resin particles | | | | | | | | | | Inorganic particles | | |
| | Loss coefficient | | Storage modulus G' | Whether or not bridging structure | Type of resin | Dispersion diameter | Stress relaxation time τ | Content of specific resin | Content of inorganic particles | SP value (S) – SP value | Type of inorganic | Volume-average particle size | Internal contamination of developing |
| | $\tan\delta_a$ | $\tan\delta_b$ | (Pa) | exists | particles | (nm) | (sec) | particles | (%) | (R) | particles | (nm) | device |
| Example 1 | 0.5 | 2.00 | 5.00E+05 | Exists | St/Ac | 150 | 50 | 12 | 3.5 | −0.20 | Hydrophobic silica 1 | 120 | A |
| Example 2 | 0.31 | 2.10 | 4.80E+05 | Exists | St/Ac | 148 | 53 | 12 | 3.5 | −0.20 | Hydrophobic silica 1 | 120 | B |
| Example 3 | 0.79 | 2.05 | 5.20E+05 | Exists | St/Ac | 147 | 45 | 12 | 3.5 | −0.20 | Hydrophobic silica 1 | 120 | B |
| Example 4 | 0.21 | 1.96 | 5.50E+05 | Exists | St/Ac | 152 | 55 | 12 | 3.5 | −0.20 | Hydrophobic silica 1 | 120 | C |
| Example 5 | 0.89 | 2.11 | 4.70E+05 | Exists | St/Ac | 161 | 44 | 12 | 3.5 | −0.20 | Hydrophobic silica 1 | 120 | C |
| Example 6 | 0.12 | 2.08 | 4.80E+05 | Exists | St/Ac | 170 | 56 | 12 | 3.5 | −0.20 | Hydrophobic silica 1 | 120 | C |
| Example 7 | 0.98 | 1.95 | 5.30E+05 | Exists | St/Ac | 175 | 43 | 12 | 3.5 | −0.20 | Hydrophobic silica 1 | 120 | C |
| Example 8 | 0.45 | 1.51 | 4.50E+05 | Exists | St/Ac | 140 | 51 | 12 | 3.5 | −0.20 | Hydrophobic silica 1 | 120 | B |
| Example 9 | 0.52 | 2.59 | 5.50E+05 | Exists | St/Ac | 143 | 53 | 12 | 3.5 | −0.20 | Hydrophobic silica 1 | 120 | B |
| Example 10 | 0.43 | 1.41 | 4.20E+05 | Exists | St/Ac | 166 | 52 | 12 | 3.5 | −0.20 | Hydrophobic silica 1 | 120 | C |
| Example 11 | 0.54 | 2.79 | 5.80E+05 | Exists | St/Ac | 135 | 59 | 12 | 3.5 | −0.20 | Hydrophobic silica 1 | 120 | C |
| Example 12 | 0.41 | 1.32 | 3.80E+05 | Exists | St/Ac | 170 | 61 | 12 | 3.5 | −0.20 | Hydrophobic silica 1 | 120 | C |
| Example 13 | 0.59 | 2.98 | 6.10E+05 | Exists | St/Ac | 172 | 39 | 12 | 3.5 | −0.20 | Hydrophobic silica 1 | 120 | C |
| Example 14 | 0.45 | 1.6 | 2.10E+05 | Exists | St/Ac | 137 | 55 | 12 | 3.5 | −0.20 | Hydrophobic silica 1 | 120 | B |
| Example 15 | 0.68 | 1.6 | 2.90E+06 | Exists | St/Ac | 158 | 61 | 12 | 3.5 | −0.20 | Hydrophobic silica 1 | 120 | B |
| Example 16 | 0.42 | 1.4 | 1.10E+05 | Exists | St/Ac | 139 | 55 | 12 | 3.5 | −0.20 | Hydrophobic silica 1 | 120 | C |
| Example 17 | 0.78 | 1.4 | 9.90E+06 | Exists | St/Ac | 177 | 43 | 12 | 3.5 | −0.20 | Hydrophobic silica 1 | 120 | C |
| Example 18 | 0.41 | 1.4 | 9.90E+04 | Exists | St/Ac | 189 | 52 | 12 | 3.5 | −0.20 | Hydrophobic silica 1 | 120 | C |
| Example 19 | 0.79 | 1.4 | 1.10E+07 | Exists | St/Ac | 133 | 47 | 12 | 3.5 | −0.20 | Hydrophobic silica 1 | 120 | C |
| Example 20 | 0.9 | 2.1 | 4.80E+05 | Not exist | St/Ac | 310 | 46 | 12 | 3.5 | −0.20 | Hydrophobic silica 1 | 120 | C |
| Example 21 | 0.91 | 2.4 | 6.80E+05 | Exists | Acryl | 150 | 59 | 12 | 3.5 | −0.20 | Hydrophobic silica 1 | 120 | C |
| Example 22 | 0.53 | 2.1 | 5.50E+05 | Exists | St/Ac | 50 | 44 | 12 | 3.5 | −0.20 | Hydrophobic silica 1 | 120 | B |
| Example 23 | 0.55 | 2.2 | 5.30E+05 | Exists | St/Ac | 500 | 52 | 12 | 3.5 | −0.20 | Hydrophobic silica 1 | 120 | B |
| Example 24 | 0.51 | 1.9 | 4.80E+05 | Exists | St/Ac | 45 | 55 | 12 | 3.5 | −0.20 | Hydrophobic silica 1 | 120 | C |
| Example 25 | 0.49 | 2.1 | 5.10E+05 | Exists | St/Ac | 505 | 49 | 12 | 3.5 | −0.20 | Hydrophobic silica 1 | 120 | C |

TABLE 3-1-continued

| | Toner | | | | | | | | | | | | |
|---|---|---|---|---|---|---|---|---|---|---|---|---|---|
| | Specific resin particles | | | | | | | | SP value (S) − SP value | Inorganic particles | | Internal contamination of developing device |
| | Loss coefficient | | Storage modulus G' | Whether or not bridging structure | Type of resin | Dispersion diameter | Stress relaxation time τ | Content of specific resin | Content of inorganic particles | | Type of inorganic | Volume-average particle size | |
| | $\tan\delta_a$ | $\tan\delta_b$ | (Pa) | exists | particles | (nm) | (sec) | particles | (%) | (R) | particles | (nm) | device |
| Example 26 | 0.5 | 2.00 | 5.00E+05 | Exists | St/Ac | 150 | 46 | 5 | 3.5 | −0.20 | Hydrophobic silica 1 | 120 | B |
| Example 27 | 0.5 | 2.00 | 5.00E+05 | Exists | St/Ac | 150 | 55 | 20 | 3.5 | −0.20 | Hydrophobic silica 1 | 120 | B |
| Example 28 | 0.5 | 2.00 | 5.00E+05 | Exists | St/Ac | 150 | 62 | 1 | 3.5 | −0.20 | Hydrophobic silica 1 | 120 | C |

TABLE 3-2

| | Toner | | | | | | | | | | | | |
|---|---|---|---|---|---|---|---|---|---|---|---|---|---|
| | Specific resin particles | | | | | | | | SP value (S) − SP value | Inorganic particles | | Internal contamination of developing device |
| | Loss coefficient | | Storage modulus G' | Whether or not bridging structure | Type of resin | Dispersion diameter | Stress relaxation time τ | Content of specific resin | Content of inorganic particles | | Type of inorganic | Volume-average particle size | |
| | $\tan\delta_a$ | $\tan\delta_b$ | (Pa) | exists | particles | (nm) | (sec) | particles | (%) | (R) | particles | (nm) | device |
| Example 29 | 0.5 | 2.00 | 5.00E+05 | Exists | St/Ac | 150 | 46 | 28 | 3.5 | −0.20 | Hydrophobic silica 1 | 120 | C |
| Example 30 | 0.5 | 2.00 | 5.00E+05 | Exists | St/Ac | 150 | 55 | 0.9 | 3.5 | −0.20 | Hydrophobic silica 1 | 120 | C |
| Example 31 | 0.5 | 2.00 | 5.00E+05 | Exists | St/Ac | 150 | 49 | 31 | 3.5 | −0.20 | Hydrophobic silica 1 | 120 | C |
| Example 32 | 0.43 | 1.7 | 3.60E+05 | Exists | St/Ac | 153 | 54 | 12 | 3.5 | −0.92 | Hydrophobic silica 1 | 120 | B |
| Example 33 | 0.6 | 2.3 | 6.20E+05 | Exists | St/Ac | 162 | 44 | 12 | 3.5 | 0.95 | Hydrophobic silica 1 | 120 | B |
| Example 34 | 0.41 | 1.6 | 3.10E+05 | Exists | St/Ac | 156 | 55 | 12 | 3.5 | −1.01 | Hydrophobic silica 1 | 120 | C |
| Example 35 | 0.45 | 2.2 | 6.50E+05 | Exists | St/Ac | 140 | 45 | 12 | 3.5 | 1.01 | Hydrophobic silica 1 | 120 | C |
| Example 36 | 0.5 | 2.00 | 5.00E+05 | Exists | St/Ac | 150 | 52 | 12 | 0.15 | −0.20 | Hydrophobic silica 1 | 120 | B |
| Example 37 | 0.5 | 2.00 | 5.00E+05 | Exists | St/Ac | 150 | 55 | 12 | 9.9 | −0.20 | Hydrophobic silica 1 | 120 | B |
| Example 38 | 0.5 | 2.00 | 5.00E+05 | Exists | St/Ac | 150 | 51 | 12 | 0.09 | −0.20 | Hydrophobic silica 1 | 120 | C |
| Example 39 | 0.5 | 2.00 | 5.00E+05 | Exists | St/Ac | 150 | 48 | 12 | 10.1 | −0.20 | Hydrophobic silica 1 | 120 | C |
| Example 40 | 0.5 | 2.00 | 5.00E+05 | Exists | St/Ac | 150 | 51 | 12 | 3.5 | −0.20 | Hydrophobic silica 2 | 63 | B |
| Example 41 | 0.5 | 2.00 | 5.00E+05 | Exists | St/Ac | 150 | 44 | 12 | 3.5 | −0.20 | Hydrophobic silica 3 | 298 | B |
| Example 42 | 0.5 | 2.00 | 5.00E+05 | Exists | St/Ac | 150 | 49 | 12 | 3.5 | −0.20 | Hydrophobic silica 4 | 58 | C |
| Example 43 | 0.5 | 2.00 | 5.00E+05 | Exists | St/Ac | 150 | 43 | 12 | 3.5 | −0.20 | Hydrophobic silica 5 | 305 | C |
| Example 44 | 0.5 | 2.00 | 5.00E+05 | Exists | St/Ac | 150 | 16 | 12 | 3.5 | −0.09 | Hydrophobic silica 1 | 120 | B |
| Example 45 | 0.5 | 2.00 | 5.00E+05 | Exists | St/Ac | 150 | 198 | 12 | 3.5 | −0.26 | Hydrophobic silica 1 | 120 | B |
| Example 46 | 0.5 | 2.00 | 5.00E+05 | Exists | St/Ac | 150 | 11 | 12 | 3.5 | −0.02 | Hydrophobic silica 1 | 120 | C |
| Example 47 | 0.5 | 2.00 | 5.00E+05 | Exists | St/Ac | 150 | 296 | 12 | 3.5 | −0.27 | Hydrophobic silica 1 | 120 | C |
| Example 48 | 0.5 | 2.00 | 5.00E+05 | Exists | St/Ac | 150 | 6 | 12 | 3.5 | 0.05 | Hydrophobic silica 1 | 120 | C |
| Example 49 | 0.5 | 2.00 | 5.00E+05 | Exists | St/Ac | 150 | 495 | 12 | 3.5 | −0.31 | Hydrophobic silica 1 | 120 | C |
| Comparative Example 1 | 0.1 | 2.1 | 5.20E+05 | Exists | St/Ac | 150 | 46 | 12 | 3.5 | −0.20 | Hydrophobic silica 1 | 120 | D |
| Comparative Example 2 | 1.1 | 2.0 | 4.80E+05 | Exists | St/Ac | 150 | 55 | 12 | 3.5 | −0.20 | Hydrophobic silica 1 | 120 | D |

TABLE 3-2-continued

| | Toner | | | | | | | | | | | | |
|---|---|---|---|---|---|---|---|---|---|---|---|---|---|
| | Specific resin particles | | | | | | | | | SP value (S) − SP value | Inorganic particles | | Internal contamination of developing device |
| | Loss coefficient | | Storage modulus G' | Whether or not bridging structure | Type of resin | Dispersion diameter | Stress relaxation time τ | Content of specific resin | Content of inorganic particles | | Type of inorganic | Volume-average particle size | |
| | tanδ$_a$ | tanδ$_b$ | (Pa) | exists | particles | (nm) | (sec) | particles | (%) | (R) | particles | (nm) | device |
| Comparative Example 3 | 0.39 | 1.3 | 3.30E+05 | Exists | St/Ac | 150 | 49 | 12 | 3.5 | −0.20 | Hydrophobic silica 1 | 120 | D |
| Comparative Example 4 | 0.62 | 3.1 | 6.50E+05 | Exists | St/Ac | 150 | 55 | 12 | 3.5 | −0.20 | Hydrophobic silica 1 | 120 | D |
| Comparative Example 5 | 0.5 | 2.00 | 5.00E+05 | Exists | St/Ac | 150 | 4 | 12 | 3.5 | 0.15 | Hydrophobic silica 1 | 120 | D |
| Comparative Example 6 | 0.5 | 2.00 | 5.00E+05 | Exists | St/Ac | 150 | 510 | 12 | 3.5 | −0.26 | Hydrophobic silica 1 | 120 | D |

The abbreviations in the tables will be described below.

Notation of numerical value of storage modulus G': exponential notation (E notation). As for the E notation, "aE+b (note that a and b are arbitrary numbers)" means $a\times10^b$. Specifically, for example, "5.00E+05" means $5.00\times10^5$.

St/Ac: styrene-(meth)acrylic copolymer resin particles

Content of specific resin particles (%): content of resin particles (% by mass) with respect to the total mass of electrostatic charge image developing toner Content of inorganic particles (%): content of inorganic particles with respect to toner particles (% by mass)

The above results tell that the toner of the present example is inhibited from contaminating the inside of a device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

toner particles that contain a binder resin and crosslinked resin particles; and an external additive that contains inorganic particles, wherein a content of the binder resin with respect to a total amount of the toner particles is 40% by mass or more and 95% by mass or less, a content of the crosslinked resin particles is 1% by mass or more and 30% by mass or less with respect to a total mass of the electrostatic charge image developing toner, a content of the inorganic particles with respect to the toner particles is 0.1% by mass or more and 10% by mass or less, a content of the inorganic particles with respect to a total mass of the external additive is 90% by mass or more and 100% by mass or less, a loss coefficient tan $\delta_a$ of the crosslinked resin particles at 40° C. and 0.1 rad/s satisfies $0.1<\tan\delta_a<1.0$, a loss coefficient tan $\delta_b$ of the crosslinked resin particles at 40° C. and 10 rad/s satisfies $1.3<\tan\delta_b<3.0$, and in a case where a strain of 0.005% is applied to the toner at 40° C., a stress relaxation time τ of the toner satisfies 5 seconds<τ<500 seconds.

2. The electrostatic charge image developing toner according to claim 1, wherein the loss coefficient tan $\delta_a$ of the crosslinked resin particles at 40° C. and 0.1 rad/s satisfies $0.2<\tan\delta_a<0.9$, and the loss coefficient tan $\delta_b$ of the crosslinked resin particles at 40° C. and 10 rad/s satisfies $1.5<\tan\delta_b<2.8$.

3. The electrostatic charge image developing toner according to claim 1, wherein a storage modulus G' of the crosslinked resin particles at 40° C. and 10 rad/s satisfies $1\times10^5$ Pa<G'<$1\times10^7$ Pa.

4. The electrostatic charge image developing toner according to claim 3, wherein the storage modulus G' of the crosslinked resin particles at 40° C. and 10 rad/s satisfies $2\times10^5$ Pa<G'<$3\times10^6$ Pa.

5. The electrostatic charge image developing toner according to claim 1, wherein the content of the crosslinked resin particles is 5% by mass or more and 20% by mass or less with respect to the total mass of the electrostatic charge image developing toner.

6. The electrostatic charge image developing toner according to claim 1, wherein the crosslinked resin particles are styrene-(meth) acrylic copolymer resin particles.

7. The electrostatic charge image developing toner according to claim 1, wherein a difference between an SP value(S) as a solubility parameter of the crosslinked resin particles and an SP value (R) as a solubility parameter of the binder resin (SP value(S)−SP value (R)) is −1.0 or more and 1.0 or less.

8. The electrostatic charge image developing toner according to claim 1, wherein a dispersion diameter of the crosslinked resin particles is 50 nm or more and 500 nm or less.

9. The electrostatic charge image developing toner according to claim 1, wherein a volume-average particle size of the inorganic particles is 60 nm or more and 300 nm or less.

10. An electrostatic charge image developer comprising:

the electrostatic charge image developing toner according to claim 1.

11. A toner cartridge comprising:

a container that contains the electrostatic charge image developing toner according to claim 1, wherein the toner cartridge is detachable from an image forming apparatus.

12. A process cartridge comprising:

a container that contains the electrostatic charge image developer according to claim 10; and a developing unit that develops an electrostatic charge image formed on a surface of an image holder as a toner image by using the electrostatic charge image developer, wherein the process cartridge is detachable from an image forming apparatus.

13. An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to claim 10 and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

14. An image forming method comprising:

charging a surface of an image holder;

forming an electrostatic charge image on the charged surface of the image holder;

developing the electrostatic charge image formed on the surface of the image holder as a color toner image by using the color electrostatic charge image developer according to claim 10;

transferring the toner image formed on the surface of the image holder to a surface of a recording medium; and fixing the toner image transferred to the surface of the recording medium.

* * * * *